July 16, 1963

J. SZYDLOWSKI 3,097,700

GAS TURBINE CONTROL METHOD AND SYSTEM

Filed Jan. 11, 1960

July 16, 1963 J. SZYDLOWSKI 3,097,700
GAS TURBINE CONTROL METHOD AND SYSTEM
Filed Jan. 11, 1960 13 Sheets-Sheet 3

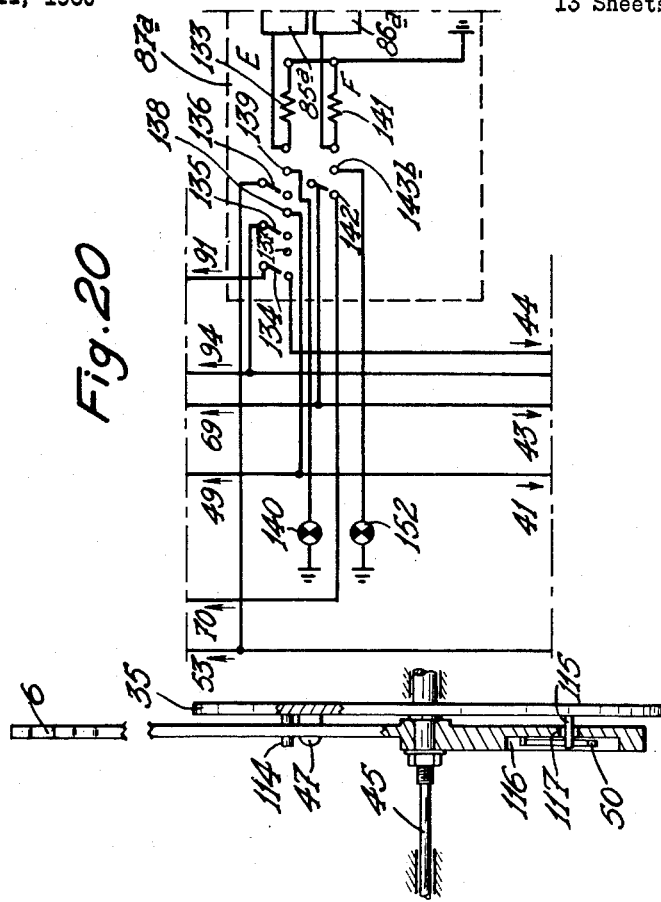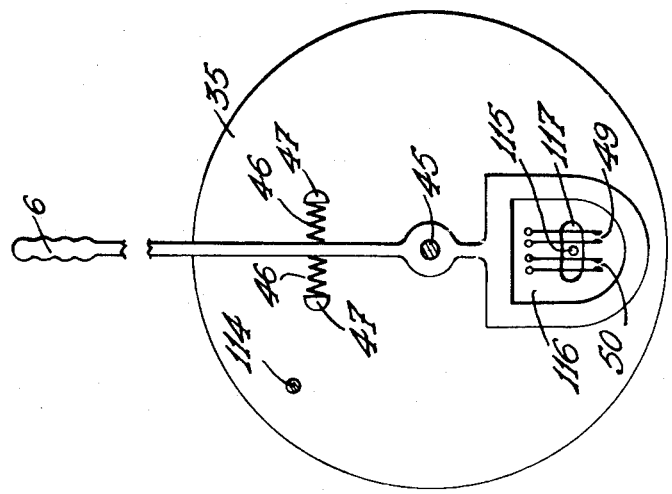

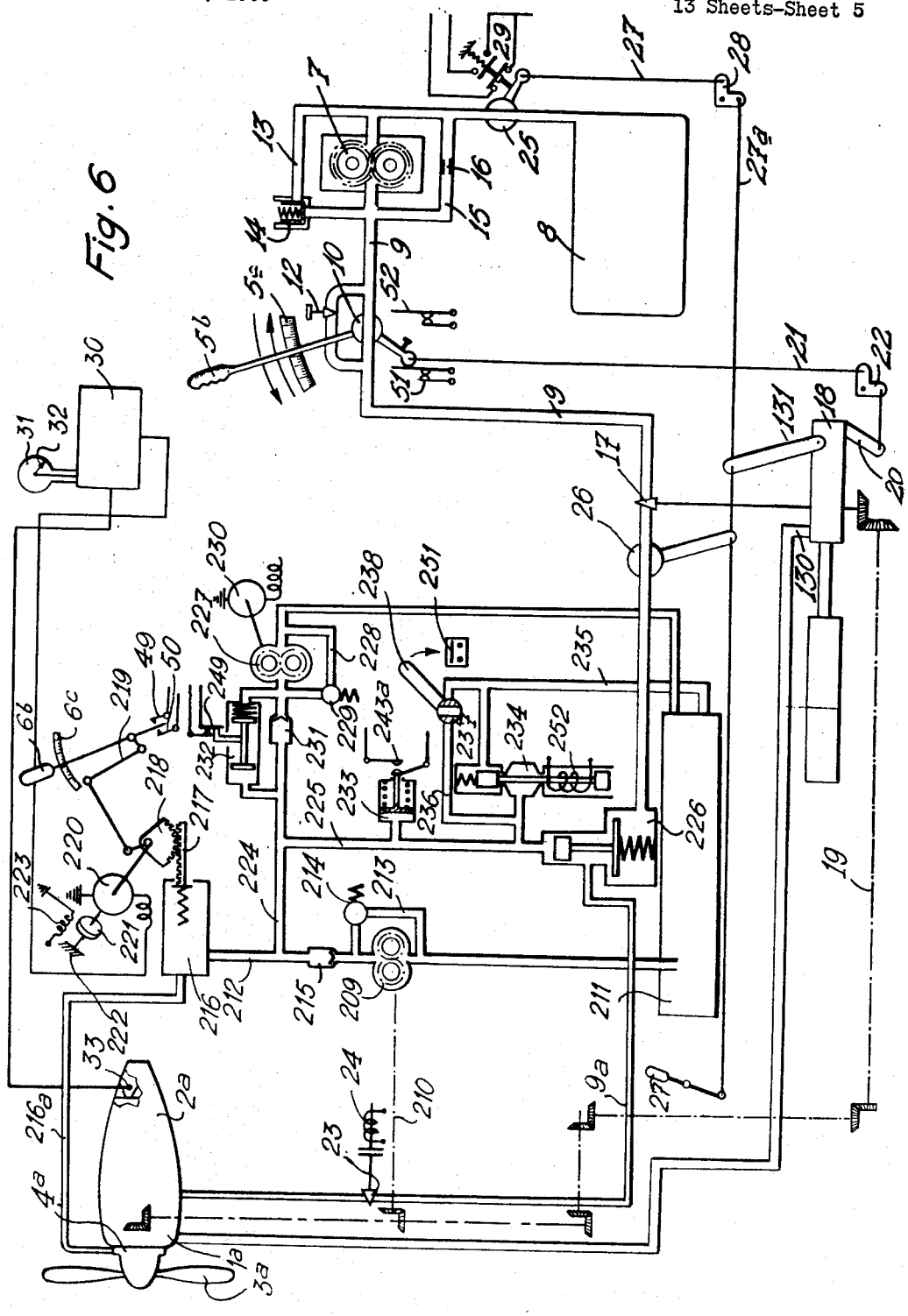

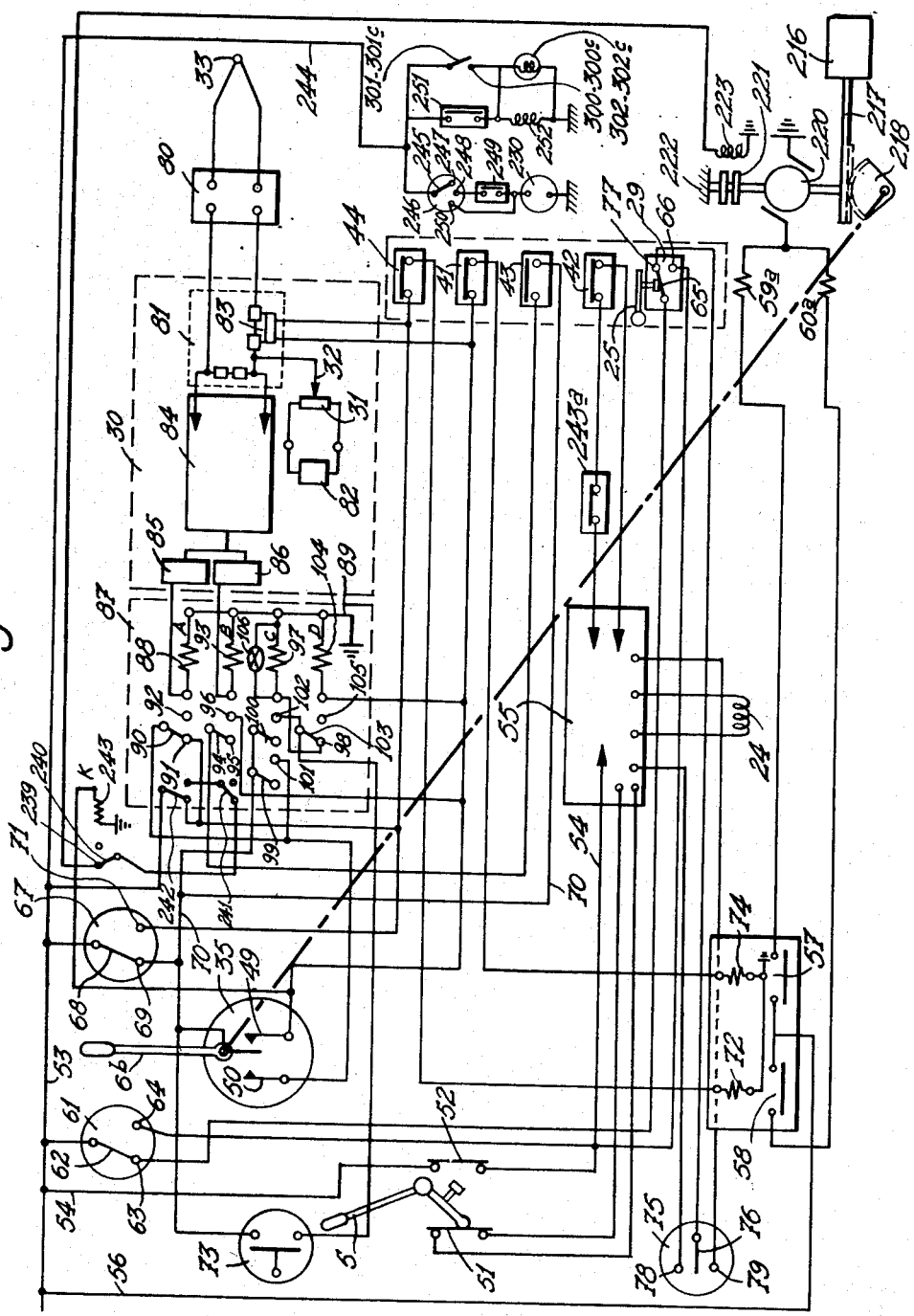

July 16, 1963   J. SZYDLOWSKI   3,097,700
GAS TURBINE CONTROL METHOD AND SYSTEM
Filed Jan. 11, 1960   13 Sheets-Sheet 7
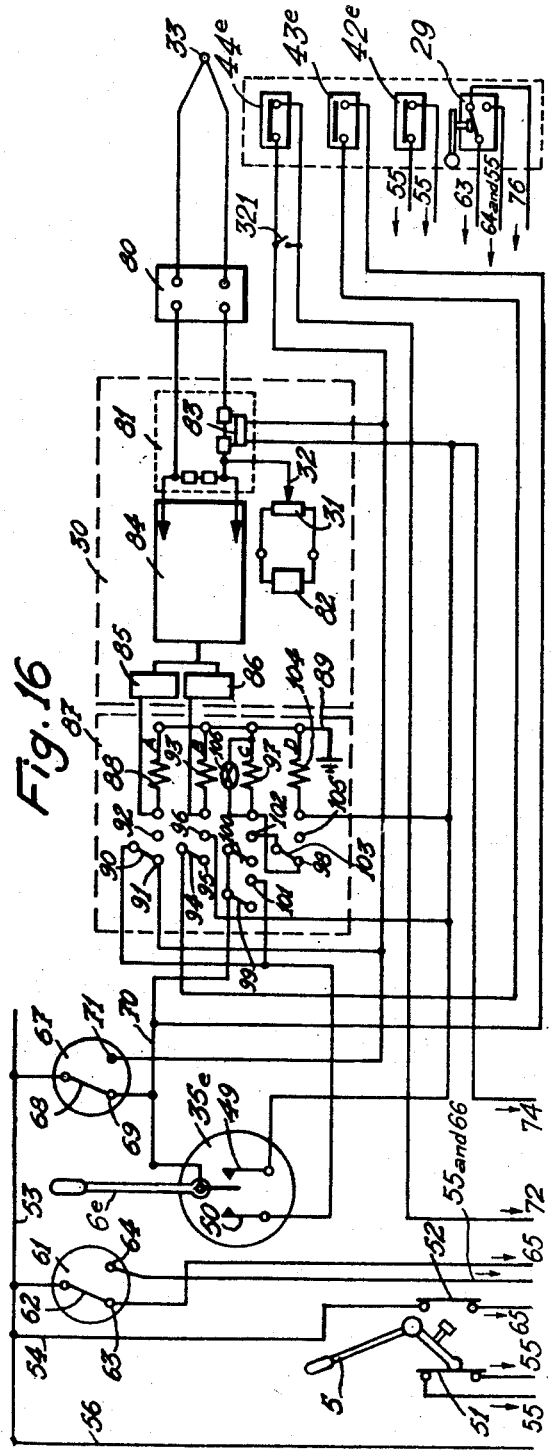
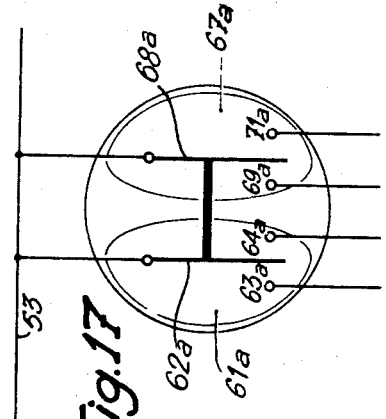
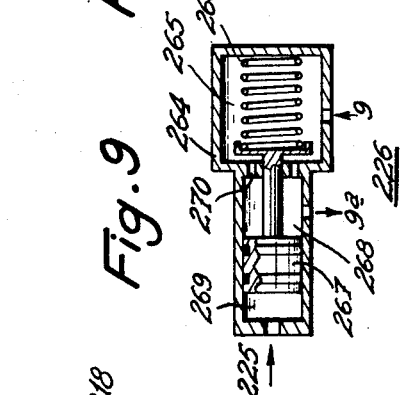
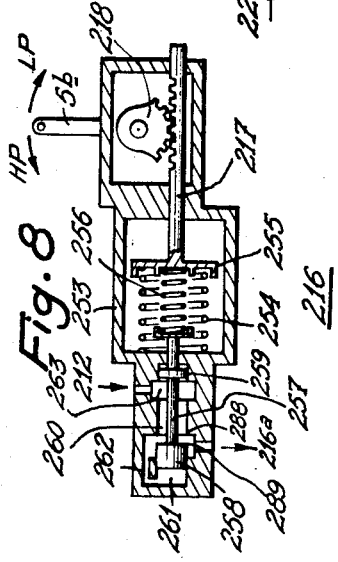

July 16, 1963
J. SZYDLOWSKI
3,097,700
GAS TURBINE CONTROL METHOD AND SYSTEM
Filed Jan. 11, 1960
13 Sheets-Sheet 8
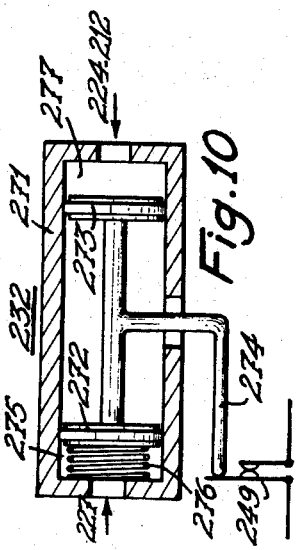
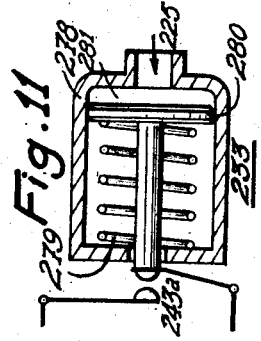
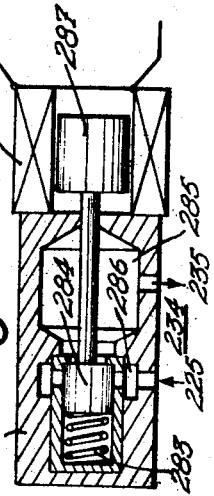
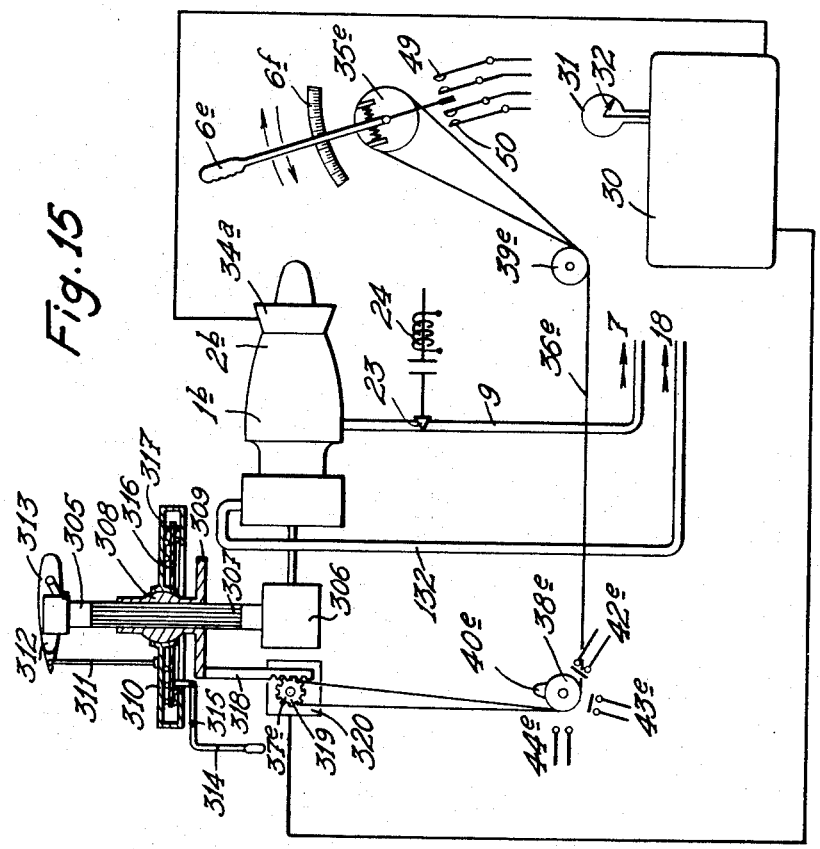

July 16, 1963    J. SZYDLOWSKI    3,097,700
GAS TURBINE CONTROL METHOD AND SYSTEM
Filed Jan. 11, 1960    13 Sheets-Sheet 9

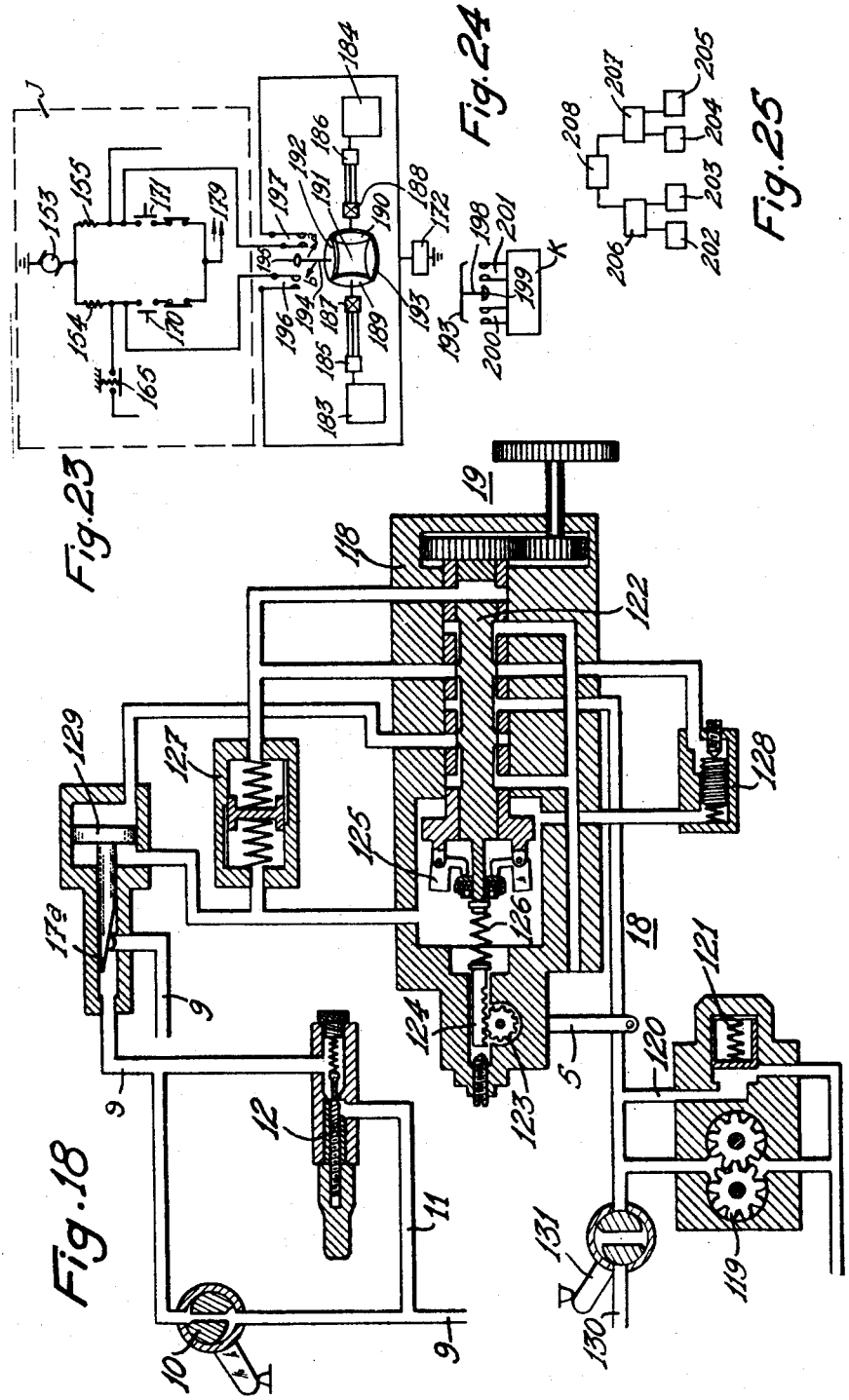

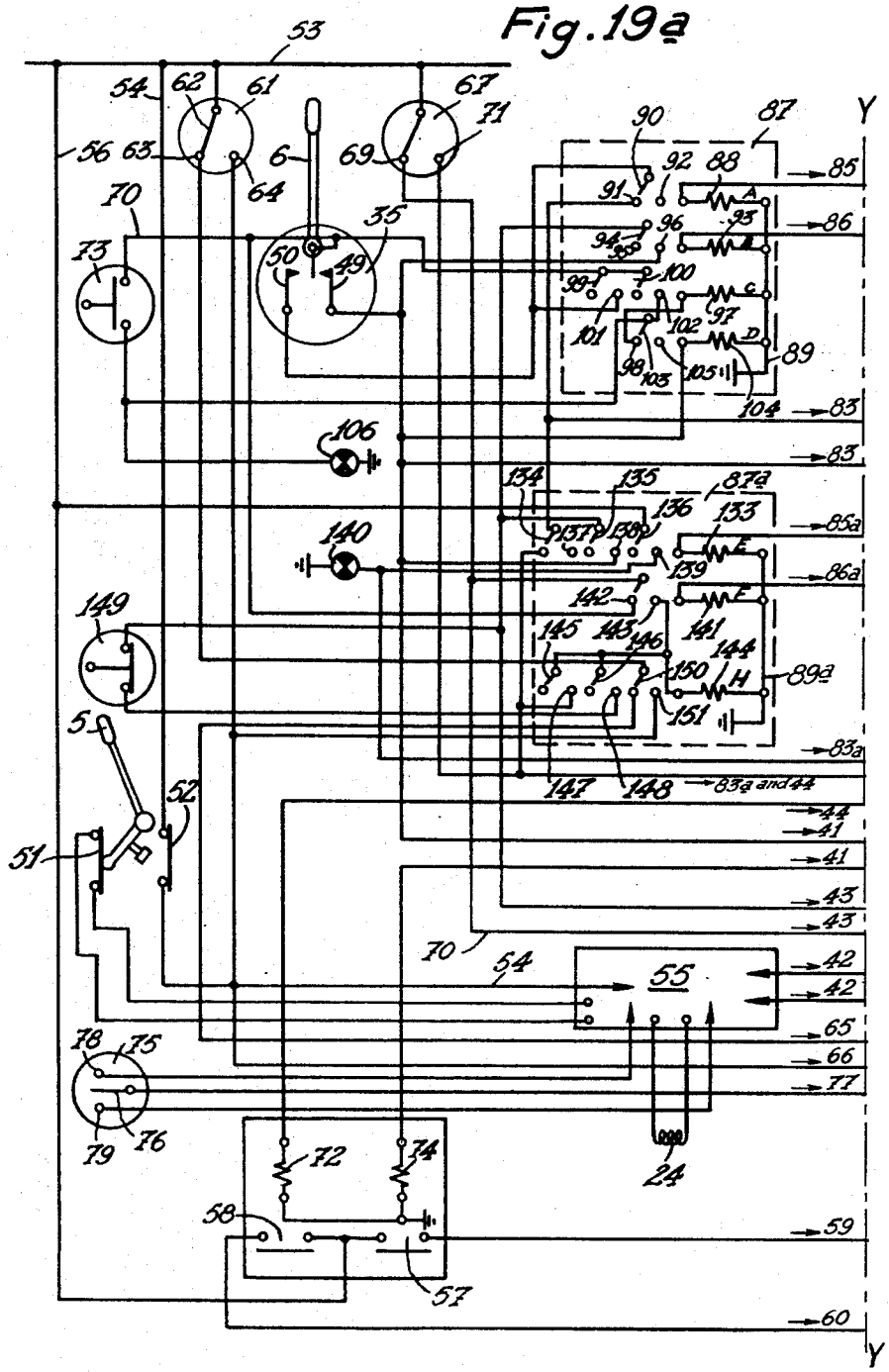

July 16, 1963 J. SZYDLOWSKI 3,097,700
GAS TURBINE CONTROL METHOD AND SYSTEM
Filed Jan. 11, 1960 13 Sheets-Sheet 13

United States Patent Office 3,097,700
Patented July 16, 1963

3,097,700
GAS TURBINE CONTROL METHOD AND SYSTEM
Joseph Szydlowski, Usine Turbomeca, Bordes,
Basses-Pyrenees, France
Filed Jan. 11, 1960, Ser. No. 1,600
Claims priority, application France Mar. 27, 1959
28 Claims. (Cl. 170—135.72)

This invention relates to control method and system for gas turbines and is particularly directed to a control method and system for a gas turbine drivably connected to an aerodynamic propelling device having blades the pitch of which may be varied, such as the pitch of an adjustable pitch propeller and the general pitch of a helicopter rotor.

There are control methods and systems for turbopropellers in which the turbine speed is maintained constant by a governor controlling the quantity of fuel delivered into the turbine, propeller pitch being controlled independently in relation to some selected parameter, such as the temperature of the gases on entry into, or on exit from, the turbine, thus enabling the propeller pitch to be adjusted from its maximum permissible value, that of feathering for a variable pitch propeller, to its minimum value, that of maximum reverse for a variable pitch propeller, over the whole permissible working range of the turbopropeller, with due regard for the maximum permissible thermal load.

Use has already been made of such a control method and device, in which the pilot determines the thermal load of the machine by means of a special control and adjusts the propeller pitch in response to this selected thermal load or, conversely, the thermal load in response to a selected propeller pitch.

With a view to simplifying control over turbopropellers of the type specified hereinbefore while at the same time maintaining a system of regulation fully adapted to a turbine-to-propeller form of coupling, the present invention has for its main object a control method for turbopropellers which consists in maintaining the turbine speed of revolution constant by means of a tachometric adjustment of the quantity of fuel delivered to the engine, controlling independently the propeller pitch, either manually, without any form of mechanical stop between minimum and maximum permissible pitch, or automatically, continuously comparing the actual temperature of the gases on turbine entry or exit with the maximum permissible temperature of said gases as previously selected, and automatically reducing the propeller pitch when this actual temperature tends to exceed the selected permissible maximum temperature.

A further object of the invention is to provide a turbopropeller control system which allows application to be made of the method specified hereinabove and which comprises an engine-speed control lever acting upon a speed governor driven by the turbopropeller and designed to provide, directly or not, adjustment of the fuel supplied to the engine in relation to the desired rate of revolution, a pitch-control lever coupled, for manual control, to the propeller pitch-varying system in order to allow turbopropeller hand-control in accordance with required flight conditions, and, for automatic control, to the propeller for setting out the blade-pitch angle, and a temperature regulator embodying means both to set the maximum permissible gas temperature and to compare this temperature with the actual temperature of the gases, this regulator being capable of reducing the pitch, without any possibility of overriding action by the pilot, to the position which corresponds to equality between these two temperatures, while at the same time setting out this pitch angle by displacement of the pitch-control lever, said regulator being further usable for obtaining an automatic variation in pitch. At the same time, such an arrangement allows dispensing with all thermal-load-setting levers and miscellaneous mechanical stops. The hand-control-type coupling between the pitch-control lever, on the one hand, and, on the other hand, the pitch-variation system and the means incorporated in the temperature regulator for setting and comparing the gas temperature, as well as the coupling between this regulator and said coupling, are preferably in the form of electric circuits.

In accordance with a characteristic of the invention, the control system includes a circuit for automatically bringing the group to its maximum power, which will be termed hereafter "automatic powering circuit," said circuit being provided with an energizing button by means of which the pilot is able to start the automatic setting-under-load process, namely the automatic increasing of the pitch until maximum loading is obtained, in so far as the actual gas temperature does not exceed the selected permissible maximum temperature.

In a preferred embodiment, with a view to simplifying the control of the machine by the pilot as far as possible, and considering that the rotation speed of the turbine, as soon as the latter has been started, remains constant under all working conditions until it is stopped by the pilot, the system specified hereinabove comprises a device which replaces the usual throttle-lever by plains buttons which, after the turbine has automatically reached its working speed, provide for an ultimate perfected regulation of the rotation speed so that optimum operation may be achieved in flight.

Thus, the pilot controls the engine by means of a single control, which makes for very great simplicity and avoids possible misapplications of the controls.

In order to retain a certain margin of security against possible failures, the system may also comprise a further, simplified safety thermal regulator which acts via its associated electrical circuits only in the event of the first thermal regulator breaking down.

Being basically electrical in design, the system adapts itself particularly well to turbopropellers having propellers the blade-pitch of which is electrically controlled. However, it is perfecty adaptable to any system of blade-pitch control in propellers.

Insofar as the rotation speed control is concerned, this is such that it permits starting, gathering speed and regulation over a certain working range, the speed governor with its very short response time-lag allied to a high degree of stability maintaining the selected speed constant over the regulation range. This rotation speed control is preferably of the type described in the U.S. patent application Serial No. 714,798, filed on February 12, 1958, now Patent No. 3,002,502, by the applicant for: "Regulating Device Associated With a Hydraulic Servo-Control."

Further features of the invention will become apparent from the following description given with reference to the accompanying drawings which are provided by way of example only and not in any limiting sense, and this description will make it clear how the invention may be put into practice. In the drawings:

FIG. 4 is a front view on a larger scale of the pitch-control lever illustrated in FIG. 3.

FIG. 5 is a side view of FIG. 4, with partial cutaway.

FIG. 6 is a schematic overall view of the mechanical portion of a control system according to the invention for groups comprising a gas turbine drivably connected to a hydraulically controlled variable-pitch propeller.

FIG. 7 is an overall view of the electrical portion of the control system illustrated in FIG. 6, in the same operative conditions as for FIG. 2.

FIG. 8 is a cross-sectional view of a hydraulic order transmitter for the pitch variation, utilized in the control system shown in FIG. 6.

FIG. 9 is a cross-sectional view of a safety valve utilized in the control system shown in FIG. 6.

FIGS. 10 to 12 are respectively cross-sectional views of a differential hydraulic pressure contactor, a hydraulic pressure contactor and an electromagnetic valve for feathering which are utilized in the control system shown in FIG. 6.

FIG. 15 is a schematic overall view of the mechanical portion of a control system according to the invention for groups comprising a gas turbine drivably connected to a helicopter rotor.

FIG. 16 is a partial view of the electrical portion of the control system illustrated in FIG. 15, the group being in stopped configuration and the rotor at zero pitch, the helicopter being at rest.

FIG. 17 is a schematic view of a twin-switch usable in the electrical diagrams of FIGS. 2, 7 and 16.

FIG. 18 is a schematic cross-sectional view of a fuel-supply control device usable with any of the control systems illustrated in FIGS. 1, 2, 6, 7, 15 and 16.

FIG. 19a and 19b represent conjointly an overall view of the electrical portion of a control system similar to the one shown in FIG. 1, comprising a safety thermal regulator incorporating means for automatic feathering, the engine being in stopped configuration and the propeller at ground zero-thrust pitch, with the aircraft at rest.

FIG. 20 is a modification of the wiring diagram shown in FIGS. 19a and 19b, the safety thermal regulator serving only to indicate a call for feathering.

FIG. 23 is an electro-mechanical diagram for a synchronizing system usable with twin-engine powerplants utilizing one automatic speeding device of the type illustrated in FIG. 21.

FIG. 24 is a simplified diagram of a synchronization system for a twin-engine powerplant utilizing two automatic speeding devices of the type illustrated in FIG. 23.

FIG. 25 is a schematic view of a synchronizing system for a four-engine powerplant.

Electrically-Controlled Variable-Pitch Propeller

Figure 1:
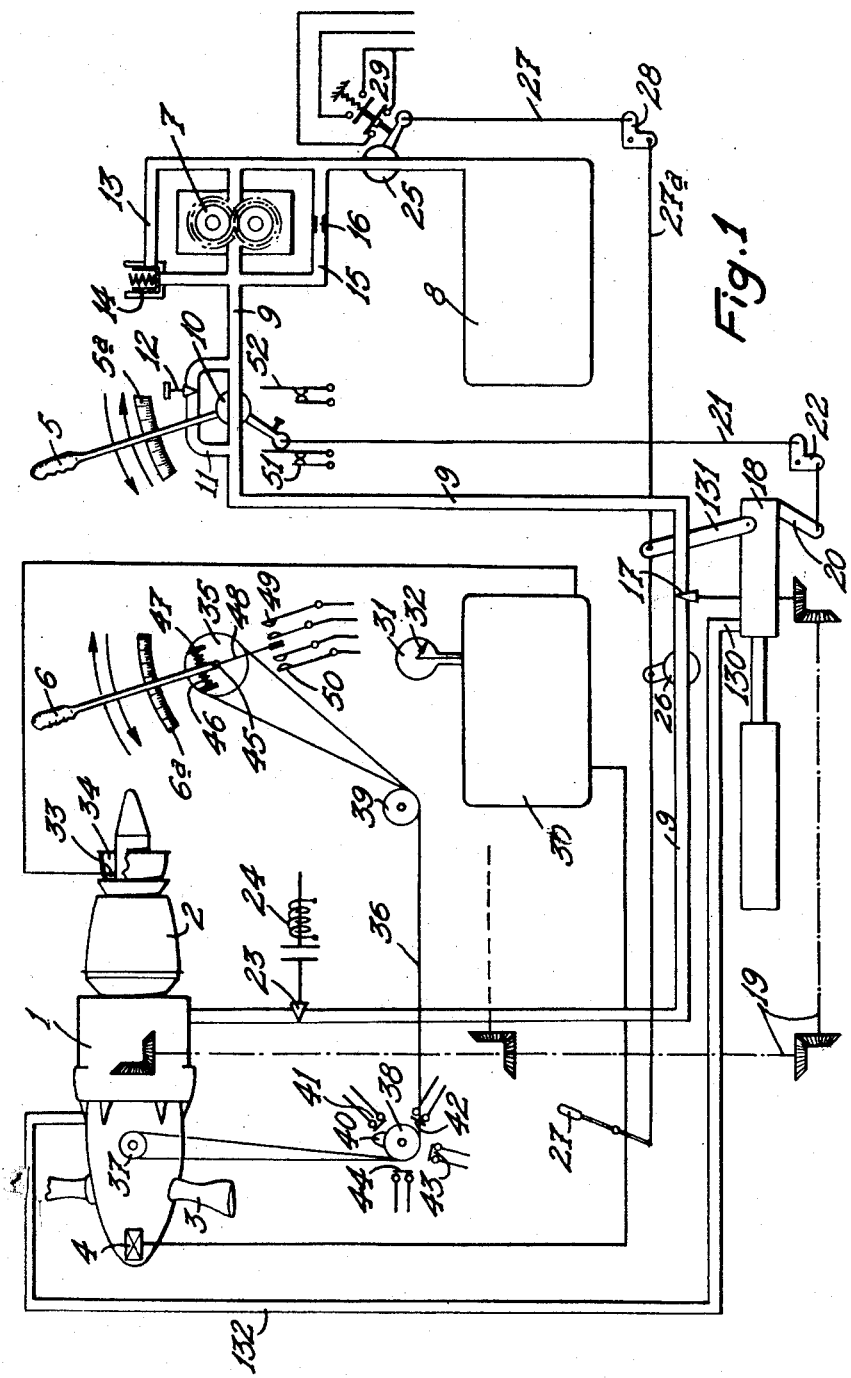
FIG. 1 is a schematic overall view of the mechanical portion of a control system according to the invention for groups comprising a gas turbine drivably connected to an electrically controlled variable-pitch propeller.

Referring now to FIG. 1, the turbopropeller consists of a compressor 1, a turbine 2 and an electrically-controlled variable-pitch propeller 3, the pitch control device of which is any conventional type operated by an electric motor 4 incorporating low and high pitch circuits. The turbopropeller is controlled by means of two levers: a throttle lever 5 and a pitch-control lever 6 which respectively move along guides 5a and 6a.

The component elements associated to the throttle lever 5 include a fuel-pump 7 which draws fuel from a tank 8 and delivers it into a conduit 9 in which is interposed a cock 10 equipped with a by-pass 11 and an adjustable idling-speed jet 12. The pump itself comprises a by-pass 13 having an adjustment valve 14, and a by-pass 15 embodying a constriction 16. Within the conduit 9 is inserted a fuel-flow controlling device 17 the opening of which is controlled by a tachometric unit 18 coupled to the turbine by an appropriate transmission 19. The rotation speed setting lever 20 is connected to the cock 10 by suitable linkage 21 in conjunction with a bell-crank 22, the complete assembly being controlled by the lever 5. The conduit 9 downstream of the controlling device 17 leads up to the fuel injector nozzles of the turbine and is equipped with a master cut-off valve 23 which is electrically controlled through the medium of a relay having a winding 24. Two hand-operated flameout cocks 25 and 26 are respectively mounted between the tank 8 and the pump 7 and between the controlling device 17 and the electric valve 23. These hand-operated flameout cocks controlled by a lever 27 are operatively connected by means of a suitable mechanical transmission 27a operating in conjunction with a bell-crank 28. The hand-operated flameout cock 25 acts upon a reversing switch 29 the function of which will be specified hereinafter.

The blade-pitch control in the variable-pitch propeller 3 is obtained by means of the electric motor 4, housed underneath the cowling of the propeller hub, and which is controlled by a temperature regulator 30 embodying a potentiometer 31 the slide 32 of which serves to set the temperature T which is not to be exceeded by the gases on exit from the turbine. One or more thermocouples 33 positioned inside the exhaust nozzle 34 of the turbine provide the temperature regulator 30 with indications of the actual temperature $t$ of the gases as they exhaust from the turbine.

The orders transmitted by the temperature regulator 30 to the electric motor 4 bring about variations in the blade-pitch of the propeller 3. These variations in pitch are transmitted to the pitch-control lever 6 carrying a disc 35, and are indicated on guide 6a by means of a cable system 36 operating in conjunction with pulleys 37, 38 and 39. An embodiment of such a cable system will be described hereinafter with reference to FIGS. 3 to 5. The pulley 38 in the simplified diagram shown in FIG. 1 carries a cam 40 the purpose of which is to operate four microswitches 41, 42, 43 and 44.

As indicated hereunder, the microswitch 41 serves to cut off the feeding of the motor 4 when the latter rotates for pitch reduction, as soon as the propeller attains the maximum reverse pitch; this is in fact an electric reverse-pitch stop. The microswitch 42 closes when the propeller is set at a $g$-pitch, which is the zero-thrust-pitch configuration wherein the propeller generates just the braking action required to counter-balance the residual thrust of the turbine at ground takeoff speed with the aircraft stopped. The microswitch 43 cuts off the feeding of motor 4 for the automatic reduction of the pitch when said pitch reaches a predetermined value G greater than $g$. The microswitch 44 serves to cut off the feeding of the motor 4 when the latter is rotating for pitch-increasing, as soon as the propeller has reached the feathered position; this is in fact an electric stop for feathering.

The pitch-control lever 6, which is fitted on the shaft 45 carrying the disc 35 with a slight friction, is drivingly connected with said shaft in rotation, when no manual action is exerted on the lever, through the medium of two springs 46 bearing against two stops 47 carried by the disc. The lever 6 carries an extension 48 the purpose of which is to close normally-open contacts 49 and 50 respectively mounted in the low and high pitch circuits of the motor 4.

The throttle lever 5 acts upon two contacts 51 and 52 the functions of which will be explained hereinafter.

Figure 2:
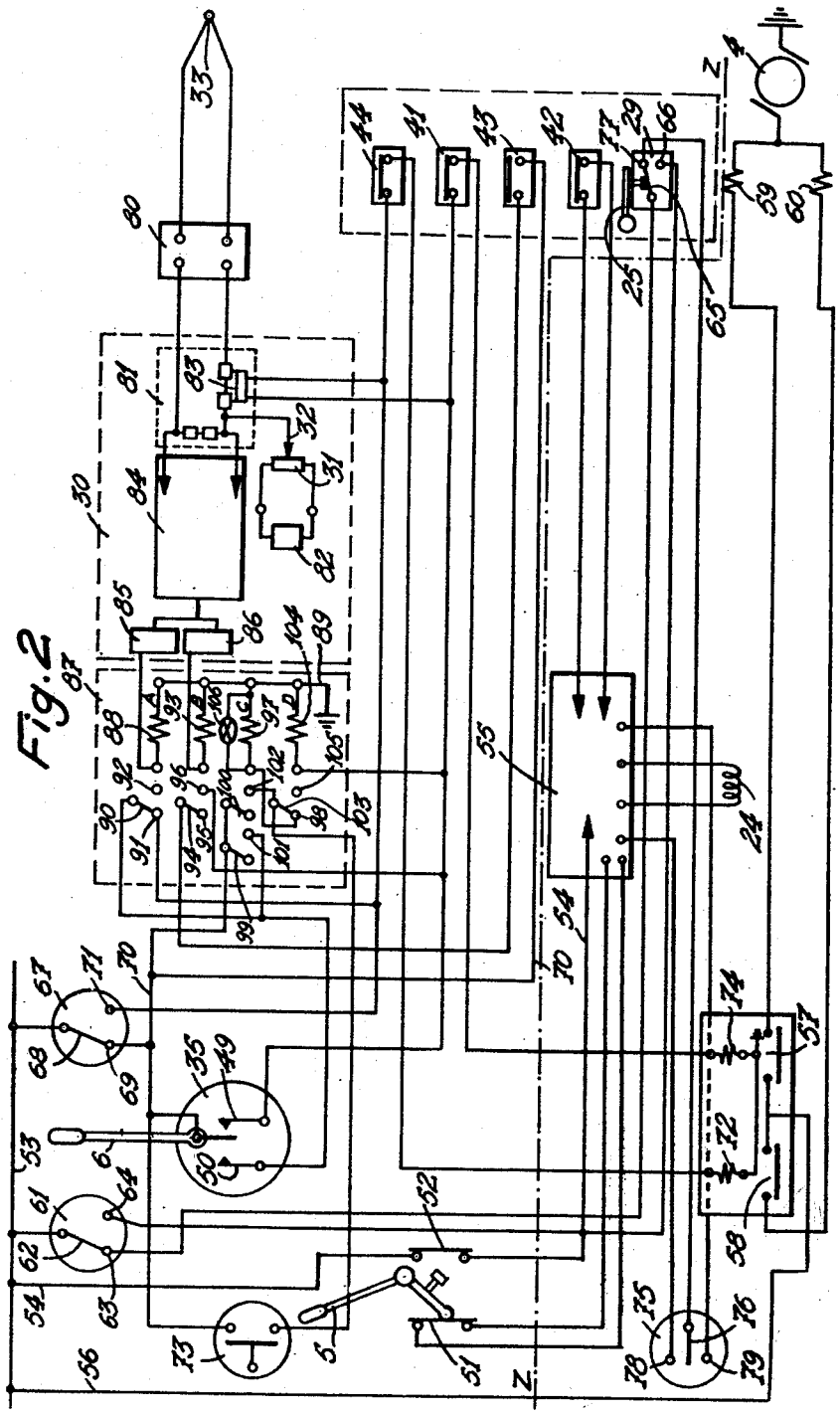
FIG. 2 is an overall view of the electrical portion of the control system illustrated in FIG. 1, the group being in stopped configuration and the propeller at ground zero-thrust pitch, the aircraft being at rest.

The electro-mechanical equipment illustrated in FIG. 2 comprises a main line 53 connected to a source of current and to which is connected a line 54 in which is interposed the contact 52 and which terminates at conventional main starting circuits 55 which, since they do not come within the scope of the invention, are not described. A second line 56 connected to the line 53 terminates at two fixed contacts of two relays 57 and 58; said fixed contacts are respectively connected to the other two fixed contacts of said relays via their movable arms, the latter fixed contacts being respectively connected to the low pitch winding 59 and the high pitch winding 60 of the electric motor 4. A two-way switch 61 has its movable arm 62 connected to the line 53, its back and working contacts 63 and 64 being respectively connected to the movable arm 65 of the reversing switch 29 and to the working contact 66 of said reversing switch. Said working contacts 64 and 66 are furthermore connected, via the line 54, to the main starting circuits 55.

A second two-way switch 67 has its movable arm 68 connected to the line 53. Its back contact 69 is connected to a main control line 70, while its working contact 71 is connected to the feathering microswitch 44, the latter being in turn connected to the winding 72 of the high pitch control relay 58. The line 70 is connected to the pitch-control lever 6; it terminates, on the one hand, at the G-pitch microswitch 43 and, on the other hand, at a normally-open automaticity button 73.

The reverse microswitch 41 is interposed between the contact 49 of the pitch-control lever 6 and the winding 74 of the low pitch control relay 57. Windings 72 and 74 are earthed.

The g-pitch microswitch 42 is connected to the main starting circuits 55.

A three-way switch 75 has its movable arm 76 connected to the back contact 77 of the switch 29 and its fixed contacts 78 and 79 connected to the main starting circuits 55, to which circuits is likewise connected the control winding 24 of the electric valve. The contact 51, which is a safety contact for operation on closure of cock 10, is inserted into a circuit terminating at the main starting circuits 55.

The thermocouple sensor or sensors 33 are connected, through the medium of a thermal cold function corrector 80, to a summator 81 housed in the temperature regulator 30. This summator is connected to the slide 32 of the potentiometer 31 which serves to set up the maximum permissible temperature T and the two extremities of which are connected to an equalized-potential source 82. A resistance-capacity circuit 83, which is energized at each hand or automatically-operated change of pitch, furnishes a follow-up potential which, when introduced into the summator 81, precludes oscillation in the overall device. The summator 81 feeds an amplifier 84 which, through the medium of two multivibrators 85 and 86, furnishes to a switching box 87 a feeder potential which is the result of the comparison effected in the summator 81 between the potential supplied by the thermocouple sensor or sensors 33 due to the action of the actual gas temperature $t$ and that supplied by the potentiometer 31 in accordance with the chosen reference temperature T.

Said switching box 87 contains four relays A, B, C and D. Relay A consists of a winding 88 connected to the multivibrator 85 and, via a common line 89, to earth; this winding acts upon a movable arm 90 connected to the contact 50 and displaces it from a back contact 91, connected to the working contact 71 and to the feathering microswitch 44, to a working dead contact 92. The relay B consists of a winding 93 connected to the multivibrator 86 and the line 89 and which serves to shift a movable arm 94 connected to the G-pitch microswitch 43 from a back dead contact 95 to a working contact 96 which is connected to the contact 49 and to the reverse microswitch 41.

The relay C consists of a winding 97 connected to the line 89 and to the back contact 98 of the relay D. This winding 97 shifts two movable arms 99 and 100 connected to the line 70, the former being moved to a working contact 101 connected to the contact 50 and to the movable arm 90 and the latter to a working contact 102 connected to the movable arm 103 of the relay D and to the automaticity button 73. The winding 104 of the relay D, which is connected to the line 89, to the contact 49 and to the reverse microswitch 41, serves to shift the movable arm 103 of relay D from its back contact 98 to its working dead contact 105. A warning lamp 106 is mounted across the winding 97 of the relay C.

Variations in the blade-pitch of the propeller are transmitted to the pitch-control lever by some mechanical arrangement which may consist in a transmission employing cables and pulleys or in any other appropriate mechanical means, torsion bars being an example.

Figure 3:
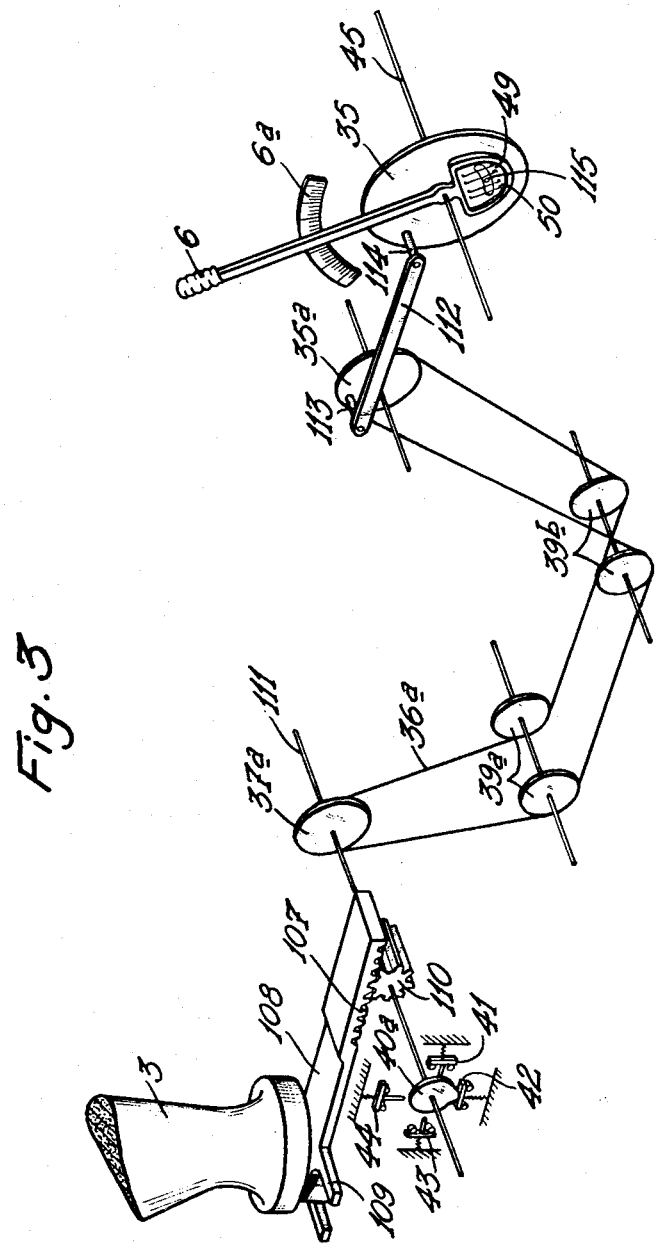
FIG. 3 is a schematic perspective view of the pitch-control lever and of a pitch-repeater device which is connected to the variable pitch propeller and connected to said lever.

In the embodiment illustrated in FIGS. 3 to 5 relating to a cable-and-pulley transmission, a rack 107 cut into the extremity of a slider-block 108 connected to the blade 3 via a crank-pin 109 meshes with a pinion 110 mounted on a shaft 111 which carries at one of its ends a pulley 37a over which runs a cable 36a. The other end of the shaft 111 carries a cam 40a which, as the shaft 111 revolves, successively operates microswitch 41, 42, 43 or 44, depending upon the actual pitch of the blade 3.

Acted upon by the set of cams 40a, (a) The microswitch 41 has its contact open when the propeller is at the maximum reverse pitch, and closed over the pitch range extending from maximum reverse to feathering;

(b) The microswitch 42 has its contact closed only at g-pitch;

(c) The microswitch 43 has its contact open between maximum reverse pitch and G-pitch, and closed between G-pitch and feathering;

(d) The microswitch 44, the contact of which remains closed from maximum reverse pitch onwards, has its contact opened when the propeller reaches the feathered position.

The cable 36a passes over sets of twin pulleys 39a and 39b before being looped over a pulley 35a.

A connecting-rod 112 is fixed to a crank-pin 113 secured on the face of the pulley 35a. The disc 35, which is keyed to the shaft 45, is linked to the pulley 35a through the medium of a crank-pin 114 and the rod 112. The rod 112 transmits the rotary motion from the pulley 35a to the disc 35. An insulated contact-pin 115 is mounted on the disc 35.

The pitch-control lever 6 is fitted with a slight friction on shaft 45. The two springs 46 which bear against the two stops 47 of the disc 35 render the lever drivingly connected in rotation with the disc 35 so long as no manual action is exerted on the lever 6. The bottom of the lever embodies a recessed portion 116 in which are mounted the two contacts 49 and 50. A slot 117 allows the contact-pin 115 to protrude into the recess 116, between contacts 49 and 50. These contacts 49 and 50 remain open as long as the lever 6 is retained in its neutral position by the springs 46.

The rotation speed regulating unit illustrated in FIG. 18 is a unit of the isodrome regulator type described in the aforementioned U.S. patent application. This unit comprises a distributer 118 fed by an oil-pump 119 which incorporates a by-pass 120 and a regulating valve 121 and in which is displaceable a slide-valve 122 which is subjected, on the one hand, to the action of the throttle-lever 5 via a pinion 123 and a rack 124 and, on the other, to that of governor-weights 125 driven by the transmission 19, a spring 126 being interposed between the rack and the slide-valve. As is specified in the U.S. patent application referred to above, the distributor is connected to an isodrome piston 127 and to a compensation valve 128 with laminar flow. The isodrome piston actuates a working-piston 129 the stem of which is provided with a tapered controlling section 17a inserted into the conduit 9 leading from the fuel-pump to the turbine injector nozzles, said working-piston acting as a fuel metering device.

Into the hydraulic line connecting the oil-pump 119 to the distributor 118 is inserted a hydraulic-power bleed 130 which may be used to operate any hydraulic auxiliary system on the aircraft, through the opening of a cock 131 connected to the transmission 27a operating the manual flameout cocks 25 and 26, the aim being to render the power bleed 130 effective when the manual flameout cocks are closed. Subsequent to the stoppage of the fuel supply to the turbine the power bleed 130 is thus capable of operating, for instance, through the medium of a conduit 132 as shown in FIG. 1, an auxiliary hydraulic feathering device, subject to the turbine continuing to revolve at a speed adequate to ensure that oil pressure is built up in the isodrome regulator 118. Obviously, the propeller pitch-varying system would require to be designed accordingly.

The system described hereinabove functions as follows:

The starting operation having taken place at a constant blade-pitch equal to the pitch g, the turbine speed is held at the chosen value by the tachometric regulator unit 18 in accordance with the position of the throttle lever 5 which, in operating the cock 10, has opened the contact 51. The microswitch 42, as well as microswitches 41 and 44, have their contacts closed. In contradistinction, the contact of microswitch 43 is open. The two-way switches 61 and 67 are in the position shown in FIG. 2. The potentiometer 31 is adjusted once for all to set up the temperature T.

In order to obtain the automatic powering without having to touch the pitch-control lever 6, the pilot presses the automaticity button 73. Pressure on this button causes the automaticity relay 97 to switch in via the circuit: line 53—two-way switch 67—line 70—button 73 (closed)—movable arm 103 on back contact 98—winding 97—line 89—earth.

The thus energized relay 97 reverses the position of its movable arms 99 and 100 which come into contact with its working contacts 101 and 102, thus enabling the winding 72 of the high pitch relay 58 to be energized via the circuit: common line 53—two-way switch 67—line 70—movable arm 99 on the working contact 101—movable arm 90 on back contact 91—feathering microswitch 44 (closed)—winding 72—earth. The relay 58 has its contact closed, thus enabling the high pitch winding 60 of the propeller electric motor 4 to be energized via the circuit: common line 53—relay 58 (closed)—high-pitch winding 60—earth, which causes motor 4 to rotate in the direction required to increase the pitch.

Simultaneously, the winding 97 of the automaticity relay is self-fed by its contacts 101 and 102 and the warning lamp 106 lights up, indicating to the pilot that automaticity is established.

The same process takes place if, with the turbine rotating at its normal working speed and the pitch being such that the engine maximum thermal loading is not attained, the pilot should wish to set the engine at automatic powering.

When the actual temperature t measured on exit from the turbine by the thermocouple of thermocouples 33 reaches the maximum value T previously set up on the potentiometer 31, the potential furnished by the amplifier 84 unlocks the multivibrator 85, thus producing the energization of the winding 88 and, subsequently, the switching-in of the relay A by establishing the contact 92 thereof which cuts off the feeding to the winding 72 of the high pitch relay 58.

If the actual temperature t decreases, the multivibrator 85 is gated once more, thus triggering denergization of the winding 88, which in turn re-establishes the contact 91 and the energization of the winding 72 of the high pitch relay 58 until the actual and preset temperatures are equal once more. So long as the temperature t remains beneath the chosen temperature T, the propeller assumes a blade-pitch such that the turbine furnishes its maximum power, with due regard for prevailing flight conditions.

The pitch increasing of the propeller is set up by displacement of the pitch-control lever 6 along the guide 6a, through the medium of the pitch repeater device described with reference to FIG. 3.

If, through maneuvering on the part of the aircraft, particularly when the latter is in a nose-up attitude, the actual temperature t becomes slightly greater than the maximum temperature T preset on the potentiometer 31, then, instead of bringing about the setting at maximum power, i.e. the increasing of the pitch, the automaticity process on the contrary involves a reduction of the pitch until the pre-established limit value G is reached. For indeed, under such conditions, the potential furnished by the amplifier 84 ungates the multvibrator 86, thus causing the energization of the winding 93 followed by the switching-in of the relay B. The energization of the winding 93 establishes the contact 96, which, through the medium of the G-pitch microswitch 43, closed at the moment when the increasing pitch passes through the value G, causes the energization of the winding 74 of the low pitch relay 57 through the medium of the reverse microswitch 41, and via the circuit: common line 53, two-way switch 67—line 70—G-pitch microswitch 43—movable arm 94 on working contact 96—reverse microswitch 41—winding 74—earth.

The switching-in of the relay 57 produces the energization of the low pitch winding 59 of the motor 4 via the circuit: common line 53—relay 57—winding 59—earth. The motor 4 rotates in the direction which produces automatic reduction of the pitch and, subject to the actual temperature t remaining slightly in excess of T when the pitch reaches the value G, this reduction in the pitch will continue until this latter value is reached. When this is so and as soon as the pitch reaches the value G, automaticity in pitch reduction ceases through opening of the contact of the G-pitch microswitch 43, which in turn cuts off the feeding of the low pitch winding 59 of motor 4.

The energization of the reverse microswitch 41 ensures the energization of the relay D which in turn establishes the contact 105 and cuts off the feeding of the relay C. The latter trips out, thereby breaking contacts 101 and 102, this in turn preventing excitation of the high pitch circuit of motor 4 via the relay 58 in the event of the multivibrator 85 not having operated.

If, before the pitch value G is attained during the pitch-reduction process, the actual temperature t becomes less than the preset temperature T, the winding 93 ceases to be energized by the multivibrator 86 which becomes locked; its contact 96 is then broken which, through its movable arm 94 being fetched on to its back contact 95, causes power to be cut off to the winding 74 of the low pitch relay 57. The motor 4 then stops and the blade pitch no longer varies.

This being so, after obtainment of the automatic powering through increasing of the pitch, breaking-off of this automaticity and establishing of automaticity in pitch reduction, these two forms of automaticity are broken off and the pilot can no longer act upon the blade pitch until he has once more activated the automaticity button 73 so as to ensure fresh automatic increasing of the pitch, or until he has manually operated the pitch-control lever 6 to increase or reduce the pitch angle.

Should the pilot not have activated afresh the automatic powering button 73 or should automaticity in increasing or reducting the pitch have been broken off as explained hereinabove, pitch increasing can be hand-controlled by the pilot subject to the express condition that the actual temperature t shall not have attained the preset value T, while pitch reduction can likewise be hand-controlled by the pilot, particularly when, in the course of the automatic pitch-reduction process, the blade pitch has reached the value G. In the last case and in order to attain pitch values below G, it is necessary to hand-operate the pitch-control lever, in order to preclude the pitch descending automatically beneath this value G without the pilot expressly commanding this. This constitutes a safety feature to prevent too low pitch values being set up which, in certain flight configurations, could cause the propeller to generate a braking action instead of a tractive action. This limit in fact constitutes a "stop" which can only be cleared manually.

During the manual operation, when the pilot grips the lever 6 and moves it for a pitch variation, the disc 35 being immobilized by the pitch repeater unit in the position corresponding to the actual propeller pitch, the lever 6 swivels about the axle 45. This movement causes the contact-pin 115 to close one of the two contacts 49 and 50.

The closure of contact 49 causes the electric motor 4 to start in the direction tending to reduce the pitch, the winding 74 of the low pitch relay 57 being then energized via the circuit: common line 53—two-way switch 67—line 70—lever 6—contact 49 (closed)—reverse microswitch 41 (closed)—winding 74—earth. This reduces the blade pitch, the latter being visually set up by the position of the lever 6 along its guide 6a. Hand-controlled reduction of the pitch can be continued right down to maximum reverse pitch, so long as the pilot moves the lever 6 for maintaining the contact 49 in closed condition. As soon as maximum reverse pitch is reached, the contact of the reverse microswitch 41 is opened by the set of cams 40a, thus cutting off the feeding of the winding 74 and subsequently that to the low pitch winding 59 of the motor 4.

The closure of contact 50 causes the electric motor 4 to start in a direction tending to increase the pitch, by energizing the winding 72 of the high pitch relay 58 via the following circuit: common line 53—two-way switch 67—line 70—lever 6—contact 50 (closed)—movable arm 90 on back contact 91—feathering microswitch 44 (closed)—winding 72—earth. If, in the course of the pitch increasing, the temperature t does not attain the maximum temperature T selected, the pilot maintains the contact 50 in closed condition and, by moving the lever, is able to reach the position corresponding to the maximum thermal loading.

Such a hand-operation in pitch-increasing is only possible when the back contact 91 of the relay A is closed, i.e. so long as the multivibrator 85 has not generated the energization of the winding 88 through equality between the actual temperature t and the chosen maximum temperature T. When these temperatures are equal, the relay A closes its working contact 92 and cuts off the feeding of the winding 72 of the high pitch relay 58 and, in consequence, that to the high pitch winding 60 of motor 4. When this is so, the contact 50 becomes ineffective even when it is maintained by the pilot in closed condition. The multivibrator 86 then comes into action and sets off the automatic reduction of the pitch until said pitch reaches the value G, which causes the pitch-control lever 6 to be moved backwards by the action of the pitch repeater unit even if the pilot should be attempting to oppose it.

As soon as manual action by the pilot on the lever 6 ceases, the springs 46 restore the latter to its neutral position. Contact 49 or 50 is broken thus generating cut off of the feeding of the motor 4 via its winding 50 or 60 as the case may be. The pitch then no longer varies.

It will be seen then that in this fashion it is the pitch-control electric motor 4 which causes the pitch-control lever 6 to pivot, and not the pilot. In consequence, when the temperature regulator 30 precludes any increasing of the pitch or even orders a reduction thereof, the pilot cannot oppose such action.

The feathering of the propeller can be effected either electrically or hydraulically if the propeller comprises, in addition to its electric feathering device, a hydraulic feathering device. In both cases before the feathering the fuel supply to the turbine is cut off either through operation of the electric cock 23 in the case electrical feathering or through closure of the hand-operated flameout cocks 25 and 26 in the case of hydraulic feathering.

As precedingly described with reference to FIG. 1, the hydraulic feathering is achieved by operating the flameout cocks 25 and 26, which in turn causes opening of the cock 131 and feeding of the hydraulic feathering actuators via the conduit 132. The operation of the flameout cock 25 results in the movable arm 65 of the switch 29 being moved to the fixed contact 66, which causes the winding 24 of the electric cock to be energized through the medium of the main starting circuits 55.

To achieve feathering electrically, the pilot must first move the two-way switch 61 so that the contact 64 is closed, this in turn causing the winding 24 of the electric cock to be energized through the medium of the main starting circuits 55. The engine is then no longer supplied with fuel and therefore comes to a stop. The pilot then cuts out the contact 69 of the two-way switch 67 and closes the contact 71 which, via the feathering microswitch 44, energizes the winding 72 of the high pitch relay 58, thus causing the blade pitch to be increased until the feathered position is reached. At this point, the set of cams 40a opens the contact of the feathering microswitch 44, which causes tripping-out of the relay 58 and cutting off of the power to the motor 4.

In order to obtain a compact overall design for the mechanical control unit, a pylon is preferably used which carries the throttle lever, the pitch-control lever, the lever for the flameout cocks and the automaticity button, while the two-way switches used to feather the propeller are mounted above the control panel.

In order to avoid inadvertent or erroneous operation of the two-way switches 61 and 67, the latter can be produced in the form of a single unit which, as illustrated in FIG. 17 consists of an insulated single body on which are mounted the movable arms 62a and 68a together with their back contacts 63a and 69a and their working contacts 64a and 71a, the movable arms 62a and 68a being mechanically connected. Thus the feathering switch 67a can be operated only after the switch 61a for closing the electric cock has functioned. This also prevents any inadvertent opening of the working contact 64a in order to open the electric cock while simultaneously attempting to start up the engine the propeller being in its feathered position.

To start the turbopropeller, the first step is to operate the lever 27 so as to open the manual flameout cocks 25 and 26, this causing the back contact 77 to be closed in the switch 29 and closure of the electric cock 23 to be subsequently cleared. Next the movable arm 76 of the switch 75 is moved on to the start contact 78 which, via the main switching circuits 55, causes the coil 24 to be energized and said electric cock to be opened. The remainder of the component elements are in the position shown in FIG. 2. As soon as the electric cock is opened, the main starting circuits 55, being fed via the line 54 and the closed contact 52, come into action and start the engine, the turbine being supplied with fuel through the idling jet 12. As soon as the idling speed has been stabilized, the pilot can operate the throttle lever 5, thus compressing the isodrome spring and opening the cock 10 supplying fuel to the turbine. When this cock is fully open, he opens the contact 52, thus cutting out the action of the main starting circuits.

To stop the engine, the pilot operates the throttle lever 5 so as to close the cock 10, then simultaneously operates the lever 27 to close the manual flameout cocks 25 and 26, and the movable arm 76 of the switch 75. The closure of the manual flameout cock 25 closes the working contact 66, which in turn closes the electric cock 23.

Hydraulically-Controlled Variable-Pitch Propeller

In the embodiment illustrated in FIG. 6, the turbopropeller comprises a compressor 1a, a turbine 2a and a hydraulically-controlled variable pitch propeller 3a the pitch control device of which is any conventional type housed in the propeller hub 4a. The turbopropeller is controlled by means of two levers: a throttle lever 5b and a pitch-control lever 6b which respectively move along guides 5c and 6c. The component elements associated to the throttle lever 5b are the same as those associated to the throttle lever 5 of FIG. 1.

The elements associated to the pitch-control lever 6b comprises a main oil pump 209 drivingly connected to the turbine 2a by means of a transmission 210 and fed with oil from a tank 211. Said pump discharges oil through a pipe 212 provided with a by-pass 213 having a regulating valve 214 and a check valve 215. The pipe 212 ends into a hydraulic order transmitter 216 controlled by a rack 217 in meshing engagement with a toothed sector 218 pivotally driven by a transmission 219 connected to the pitch-control lever 6b or by an electric motor 220 which is connected to an electromagnetic clutch device 221 interposed between said motor and a fixed point 222 and having a winding 223. The order transmitter 216 is connected to hub 4a through a pipe 216a.

To the pipe 212 is connected a pipe 224 communicating with a pipe 225 ending into a safety-valve 226 inserted in the fuel line 9. Said pipe 224 is fed with oil by an auxiliary pump 227 connected to the tank 211 and provided with a by-pass 228 having a regulating valve 229. Said auxiliary pump is driven by an electric motor 230. Inside pipe 224 is mounted a check valve 231. A bypass over said check valve contains a differential hydraulic pressure contactor 232. On pipe 225 are branched a hydraulic pressure contactor 233 and an electromagnetic valve 234 for feathering which is connected through a pipe 235 with the oil tank 211. Said electromagnetic valve 234 is provided with a by-pass 236 having a cock 237 controlled by a hand-lever 238.

The electro-mechanical equipment illustrated in FIG. 7 derives from that shown in FIG. 2 and differs therefrom as follows:

The electric motor 220 mechanically connected to the pitch-control lever 6b replaces the motor 4 and is provided with a low pitch winding 59a and a high pitch winding 60a. The winding 223 of clutch 221 is earthed and connected to the back contact 239 of a relay K which is connected at rest to the movable arm 240 of said relay connected in turn to the back contact of a second movable arm 241 of relay B, which movable arm 241 is connected to the working dead contact of a second movable arm 242 of relay A. Said movable arm 242 is connected to the main line 53 while its back contact is connected to the back contact 91. The winding 243 of relay K is earthed and connected to contact 49. A contact 243a operated by the hydraulic pressure contactor 233 is interposed between the g microswitch 42 and the main starting circuits 55.

A line 244 connected to the main line 53 feeds the movable arm 245 of a three-way switch 246 having a dead contact 247. Its central contact 248 is connected to a switch 249 controlled by the differential hydraulic pressure contactor 232 and interposed in the feeding line of motor 230. Its other contact 250 is directly connected to said last feeding line downwards of said switch 249.

The line 244 is further connected to a switch 251 controlled by the feathering hand-lever 238. Said switch 251 is connected to the winding 252 of the electromagnetic valve 234 of feathering.

The order transmitter 216, as shown in FIG. 8, comprises a body 253 housing two concentrical springs, an outer spring 254 on which bears a plate 255 integral with rack 217 and an inner spring 256 interposed between said plate 255 and a slide-valve 257 provided with two blanks 258 and 259 and which is displaceable through a bore 260. The chamber 261 behind blank 258 is connected by a passage 262 to said bore 260 and is also connected to pipe 216a. The chamber 263 is directly connected to pipe 212.

The safety valve illustrated in FIG. 9 comprises a body 264 formed with a chamber 265 connected to the fuel feeding pipe 9. Within said chamber is located a spring 266 on which acts a piston 267 displaceable in a cavity which is divided in two chambers 268 and 269 by said piston. Chambers 265 and 268 are interconnected through passages 270. The chamber 268 is connected to the pipe 9a for feeding the turbine nozzles while chamber 269 is connected to the oil pipe 225.

In the embodiment illustrated in FIG. 10, the differential hydraulic pressure contactor 232 comprises a body 271 within which are displaceable two pistons 272 and 273 connected to a common stem 274 adapted to operate the contact 249. In the chamber 275 defined by piston 272 and which communicates with the auxiliary pump 227, is located a spring 276. The chamber 277 defined by piston 273 is connected to the main oil pipe 212 through pipe 224.

The hydraulic pressure contactor 233, as shown in FIG. 11, comprises a body 278 within which moves against the action of spring 279 a piston 280 the stem of which acts on the contact 243a. The free chamber 281 of said body communicates with pipe 225.

The feathering electromagnetic valve 234 as illustrated in FIG. 12 comprises a body 282 within which moves against the action of a spring 283 a piston 284 which normally closes the passage between a chamber 285 connected to pipe 235 and a chamber 286 connected to pipe 225. Said piston carries a movable core 287 submitted to the action of winding 252.

The assembly thus described operates as follows:

The pressure of oil transmitted through pipe 216a to the hub 4a for determining the blade-pitch of the propeller 3a is controlled in the following manner. For each position of the pitch-control lever 6b, by means of sector 218, rack 217 and plate 255 (FIG. 8), the force exerted by spring 256 is balanced by the oil pressure acting on the free surface of blank 258 in the chamber 261. Said oil which is laminated between the edges 288 of the body 253 and 289 of blank 258 penetrates into the chamber 261 through the passage 262 for operating such a balancing effect.

The electro-mechanical equipment shown in FIG. 7 operates as the one illustrated in FIG. 2 for obtaining the starting of the turbopropeller, the automatic powering, the automatic reduction of the pitch towards G, the manual pitch-control, the stopping and the feathering. Therefore it is not necessary to over again describe said operations.

However the motor 220 can only rotate when the winding 223 of clutch 221 is not energized, such an energization generating the locking of clutch 221 which stops said motor. Said winding 223 is only energized by the energization of the winding 88 of relay A, i.e. when the actual temperature $t$ equals the selected maximum temperature T, the movable arm 242 being then shifted on its working contact for establishing the circuit: line 53—movable arm 242 on its working contact—movable arm 241 on its back contact—movable arm 240 on its back contact—winding 223—earth. The winding 223 is deenergized for permitting rotating motor 220, on the one hand, when the winding 93 of relay B is energized for $t$ greater than T, which shifts the movable arm 241 on its working dead contact, and, on the other hand, when the pilot acts on pitch-control lever 6b for decreasing the pitch, which shifts the movable arm 240 on its working dead contact.

To start the turbopropeller the first step is to place the movable arm 245 of the three-way switch 246 on contact 248. No pressure exists in the main oil circuit and therefore, no pressure existing in chamber 277 of the differential hydraulic pressure contactor 232 (FIG. 10), spring 276 removes the stem 274 from the contact 249 which is closed. The auxiliary motorpump 227—230 is started and the pressure is established in the propeller circuit 212—216a by feeding pipe 224, the check valve 215 precluding oil to reach the main pump 209. The oil pressure acts on piston 280 of the hydraulic pressure contactor 233 (FIG. 11) which generates the closure of switch 243a for permitting the energization of the main starting circuits 55 when the pilot places the pitch-control lever 6b on the position corresponding to the g pitch. The g-microswitch 42 is then closed.

Under the action of the main starting circuits 55 the turbine is started, simultaneously driving the main oil pump 209 which feeds with oil under pressure the propeller circuit 212, 216a. The feeding of pipe 224 by the auxiliary pump 227 is interrupted by closure of the check valve 231 and the pressure existing in said pipe 224 acts on the piston 273 of the differential hydraulic pressure contactor 232 which moving against spring 276 opens the contact 249. The auxiliary pump 227 is stopped.

However if at this time the pilot displaces the movable arm 245 of the three-way switch 246 on contact 250, the motor 230 is maintained under tension which gives, more particularly at take-off and landing, a safety for avoiding any possible operative difficulty for pump 209. By positioning said movable arm 245 on contact 247, pump 227 remains stopped even if pump 209 is inoperative.

The feathering may be further controlled manually by means of hand-lever 238 and electrically by means of the electromagnetic valve 234 when moving said lever in the direction of the arrow for opening the cock 237 and closing the switch 251. The winding 252 is thus energized and pushes back the core 287 (FIG. 12) for displacing piston 294 against the action of spring 283. The oil pressure drops instantaneously in the propeller circuit due to the communication thus established between pipes 225 and 235. Further the fuel feeding of the turbine is automatically cut off due to the fact that the safety valve 226 closes under the action of its spring 266 (FIG. 9).

If for any reason the actual propeller pitch does not correspond to that indicated by the pitch-control lever 6b on its guide 6c, this fact must be signalled to the pilot and eventually the fuel feeding may be cut off. Generally such a trouble may result, on the one hand, from a jamming of the order transmitter 216 or an oil leak in pipes 212, 216a and, on the other hand, from a jamming of the operative members of hub 4a. In order to remove said trouble the devices illustrated in FIGS. 13 and 14 may be used.

Figure 13:
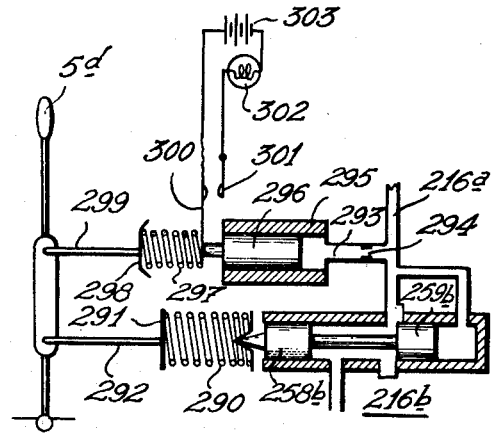
FIGS. 13 and 14 represent schematically safety devices respectively acting if the order transmitter or the control members of the variable-pitch propeller are jammed.

As shown in FIG. 13, the slide valve of the order transmitter 216b provided with its two blanks 258b and 259b acts on a spring 290 which bears on a plate 291 connected by a link-rod 292 to the pitch-control lever 6d. The pipe 216a at the exhaust of the transmitter 216b is connected through a pipe 293 provided with a restricted orifice 294 to a cylinder 295 within which a piston 296 is displaceable against a spring 297. Said spring bears against a plate 298 connected to the pitch-control lever 6d by a link-rod 299. Said spring carries at one of its ends a contact stud 300 cooperating with a contact stud 301 connected to a warning device either visual or audible, such as a warning lamp 302 fed by a current source 303. As long as the order transmitter 216b correctly operates, the springs 290 and 297 are compressed for balancing the pressure applied on blanks 258b and 259b as well as on piston 296. If the transmitter is jammed, the spring 290 is compressed without exerting any action on blanks 258b and 259b. The spring 297 moves with piston 296, the contact 300—301 is closed and the warning lamp 302 lights up.

Figure 14:
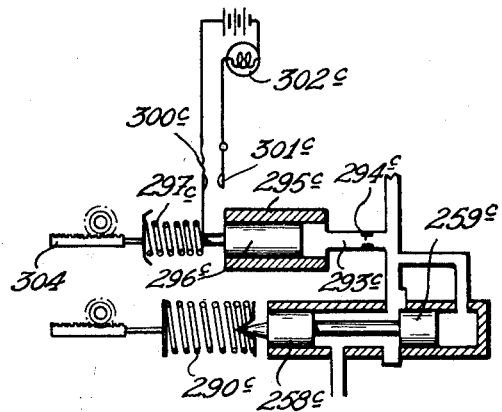

When the members of hub 4a are jammed, the embodiment of FIG. 14 is utilized, wherein the elements similar to those of FIG. 13 have the same reference numeral followed by the letter c. It only differs from the embodiment of said FIG. 13 by the fact that the pitch-control lever 6d is replaced by operative members of the pitch-variation mechanism, such as racks 304 on which act the springs 290c and 297c.

Helicopter Rotor

The g variations in general pitch of a helicopter rotor differ from those in pitch of a variable-pitch propeller by the fact that, on the one hand, there is neither reverse pitch nor feathering and, on the other hand, the feathering pitch is replaced by a permissible maximum pitch while the zero-thrust-pitch g and the predetermined pitch G are respectively replaced by the zero-pitch and a pitch P which maintains safety for the helicopter.

In the embodiment illustrated in FIG. 15, the gas turbine comprises a compressor 1b, a turbine 2b and a jet nozzle 34a housing the thermocouple or thermocouples connected to the thermal regulator 30. Said turbine drives the rotor shaft 305 through a transmission box 306. Said rotor shaft 305 is provided with splines 307 engaging a swivel bearing 308 integral with a plate 309 acting as general-pitch control plate. The swivel bearing 308 drives the cyclic-pitch swashplate 310 which is connected, via rods 311, to the pitch-variation levers 312 carried by the rotor blades 313. Cyclic-pitch control is effected by means of a lever 314 pivoted at 315 and which acts an a stationary plate 316 mounted on the swashplate 310 by means of ball bearings 317, and which causes said rotating swashplate to tilt with respect to the swivel bearing 308.

The general-pitch control plate 309 carries a rack 318 parallel to the rotor shaft 305 and which engages a pinion 319 driven by an electric motor 320 electrically connected to the thermal regulator 30. The operative orders transmitted from said thermal regulator to motor 320 generate variations in the general-pitch of the rotor. Said variations, as in the embodiment shown in FIG. 1 are transmitted to the general-pitch control lever 6e provided with a disc 35e and set up on its guide 6f by means of a cable system 36e equipped with pulleys 37e, 38e and 39e, similar to the one illustrated in FIGS. 3 to 5. The pulley 38e carries a cam 40e adapted to operate three microswitches 42e, 43e and 44e.

The microswitch 42e only closes its contact when the general-pitch of the rotor is equal to zero. The microswitch 43e is adapted to cut off the automatic pitch, decreasing when the pitch reaches while decreasing a predetermined positive low value P for which safety is maintained for the helicopter, such as that of the pitch corresponding to the stationary flight, its contact remaining open from the zero-pitch to the P-pitch and being closed from said P-pitch to the permissible maximum pitch. The microswitch 44e serves to cut off the feeding of motor 320 in the direction of increasing pitch when the general-pitch attains its permissible maximum value and its contact remains closed from the zero-pitch to said permissible maximum pitch for which it opens. The value of the P-pitch is adjusted according to the helicopters and to their limit conditions of utilization. The component elements associated to the throttle lever and said throttle lever are the same as those illustrated in FIG. 1.

FIG. 16 illustrates a part of the electro-mechanical equipment utilized for controlling the gas turbine of FIG. 15, the other part of said equipment being similar to the lower portion of FIG. 2 under the line Z—Z with the replacement of motor 4 by motor 320.

The equipment illustrated in FIG. 16 differs from the upper portion of FIG. 2 above the line Z—Z by the fact that, on the one hand, the automaticity button 73 and the reverse microswitch 41 as well as their associated circuits are suppressed and, on the other hand, the microswitches 42, 43 and 44 are respectively replaced by the microswitches 42e, 43e and 44e, a hand-operated switch 321 normally open and provided with an automatic release device being able to shunt the permissible-maximum pitch microswitch 44e.

Said electro-mechanical equipment is operated as the one illustrated in FIG. 2 for obtaining the starting of the gas turbine at zero-pitch, the automatic reduction of the pitch towards P, the manual control of the pitch between the zero-pitch and the permissible maximum pitch, and the stopping of the unit. In the description of said operations for a turbopropeller equipped with an electrically-operated variable-pitch propeller it is only necessary to respectively replace the locutions "g pitch," "G pitch" and "feathering" by the locutions "zero-pitch," "P pitch" and "permissible maximum pitch."

However if under peculiar flight conditions the pitch must have a value greater than the permissible maximum value, the shunting of the microswitch 44e by the closure of switch 321 allows to control and indicate such a greater pitch, provided that the actual temperature $t$ be less than the selected maximum temperature T.

*Safety Equipment*

Figure 19B:
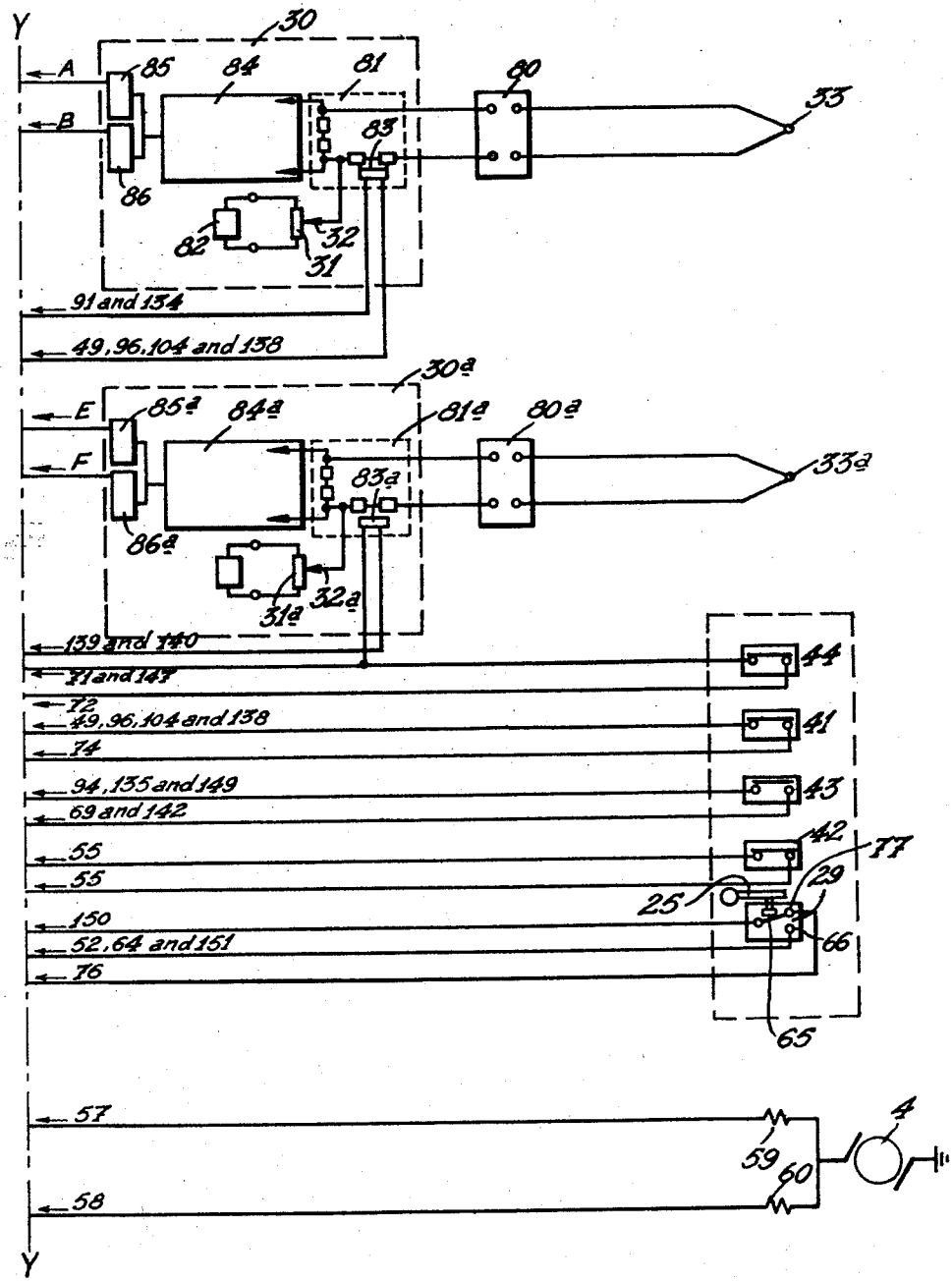

In the embodiment shown in FIGS. 19a and 19b which derives from the embodiments illustrated in FIGS. 2, 7 and 16, the control system illustrated for a turbopropeller comprises a safety box 30a designed to act as a standby in the event of possible failures in the temperature regulator 30. This box is constituted in identical manner to the temperature regulator 30 and its component elements bear the same reference numerals as those of the regulator 30, followed by the index letter $a$. Like said regulator 30, current is applied to it by the thermocouple sensors 33a via a thermal cold junction corrector 80a; its summator 81a compares the potential furnished by the thermocouple sensors 33a to the constant potential corresponding to the setting of the slide 32a of a potentiometer 31a preset to a temperature $Ta$ in excess of the temperature T indicated by the potentiometer 31. The resultant potential is transmitted to the amplifier 84a which then launches it into the two multivibrators 85a and 86a.

This safety box is associated to a safety switching box 87a containing three relays E, F and H. The relay E has a winding 133 connected to the multivibrator 85a and to earth via a common line 89a. This relay comprises three movable arms 134, 135 and 136. Through its back contact, the movable arm 134 ensures connection between the back contact 91 of relay A and the feathering microswitch 44, as well as with the working contact 71 of the two-way switch 67, the working contact 137 of this movable arm 134 being a dead contact. The back contact of the movable arm 135 is a dead one; this movable arm is connected to the line linking the movable arm 94 of relay B to the G-pitch microswitch 43, its working contact 138 being connected to the line which links the contact 49 and the reverse microswitch 41. The back contact of the movable arm 136 is a dead one, its working contact 139 being connected to a warning lamp 140.

The relay F has a winding 141 which is energized by the multivibrator 86a and connected to the line 89a. Said relay has a movable arm which is connected to the back contact 69 of the two-way switch 67 and to the G-pitch microswitch, the back contact 142 of this movable arm being connected to the line 70 so as to energize it. Its working contact 143 serves to energize the winding 144 of the relay H and is also connected to two movable arms 145 and 146 of this latter relay.

The movable arm 145 has a back dead contact and a working contact 147 which is connected to the back contact of the movable arm 134 and to the feathering microswitch 44. The movable arm 146 has a back dead contact and a working contact 148 which is connected to one of the contacts of a rearming button 149 the other contact of which is connected to the line linking the G-pitch microswitch 43 to the arms 94 and 135. The relay H possesses a third movable arm 150 which has a back contact connected to the movable arm 65 of the switch 29 and a working contact 151 which is connected to the line linking the working contact 64 of the two-way switch 61 to the working contact 66 of the switch 29.

This safety system functions as follows:

If, as the result of some failure in the temperature regulator 30, the actual temperature measured by the thermocouple sensors 33a should be greater than the temperature $Ta$ set up on the potentiometer 31a, the multivibrator 85a energizes the relay E which in turn closes its contacts 137, 138 and 139. Closure of the contact 137 cuts off possible energization of the winding 72 of high pitch relay 58, with ensuing cutting off of the excitation current to the high pitch winding 60 of the motor 4. Closure of the contact 138 allows energizing the winding 74 of the low pitch relay 57, this in turn causing the low pitch winding 59 of the motor 4 to be energized, with ensuing reduction of the propeller pitch down to the value G. Closure of the contact 139 causes the overheat warning light 140 to light up.

Should the reduction in blade pitch have failed to bring down the actual temperature $t$ below the temperature $Ta$ set up on the potentiometer 31a, the multivibrator 86a comes into operation and causes the relay F to switch in. The movable arm of said relay then leaves the back contact 142 and closes on the working contact 143.

Closure of contact 143 results in:

(a) Energizing of the relay H which reverses its contacts;

(b) Cutting off of possible excitation current to the windings 72 and 74 of high and low pitch relays 58 and 57, respectively, by operation of the lever 6;

(c) Automatic feathering of the propeller.

The foregoing can be explained by the fact that since contact 143 has closed the relay H is self-energized by its contact 148 via the rearming button 149. Closure of movable arm 150 on contact 151 energizes the winding 24 of the electric valve through the medium of the main starting circuits 55, and subsequently closes this electric valve 23. Lastly, closure of movable arm 145 on contact 147 energizes the winding 72 of the high pitch relay 58 via the feathering microswitch 44. This causes the high pitch winding 60 of the motor 4 to be energized and the latter then rotates the propeller blades until they reach the feathered position, whereat the set of cams 40a opens the feathering microswitch 44.

If, notwithstanding the overheating, the pilot should wish to attempt to relight the engine while in flight, it will be necessary for him to depress the rearming button 149 so as to break the self-energizing circuit of relay H via the contact 148. Relay H then trips out, thus breaking contacts 148 and 151. Breaking of this latter contact allows the electric valve 23 to be opened once more.

The diagram shown in FIGS. 19 may be modified as shown in FIG. 20 with a view to replacing the automatic feathering system by a call for feathering, such an operation being then manually controlled by the pilot.

To this end, the relay H is dispensed with in the safety switching box 87a and the working contact 143b of relay F is then merely connected to a warning lamp 152.

Such a system will operate as shown in FIGS. 19 if, as a result of a breakdown in the temperature regulator 30, the actual temperature $t$ becomes higher than the temperature $Ta$ set up on the safety potentiometer. However, should the reduction in blade pitch fail to lower the actual temperature $t$ below the temperature $Ta$, closure of the contact 143b results in the feathering warning lamp 152 being lit up and the pilot then operates the pitch-control lever 6 in order to feather the propeller as indicated precedingly.

The same safety equipment may be used for a turbopropeller having a hydraulically-operated variable-pitch propeller by inserting the safety box of FIGS. 19a, 19b or 20 and its related circuits in the equipment illustrated in FIG. 7.

In the case of a helicopter the rotor of which is driven by a gas turbine, the safety box of FIG. 20 and its related circuits may be inserted in the equipment shown in FIG. 16, the circuits interconnecting said safety box, the switching box and the reverse microswitch being suppressed.

*Automatic Speeding System*

An improvement to the devices described hereinabove consists in automatically fetching up the turbine, after it has been started, to its maximum speed and in being able, by means of electrical impulses, to make the engine rotate at any speed within the working range of the speed governor. Such an operation will be termed "automatic speeding."

Figure 21:
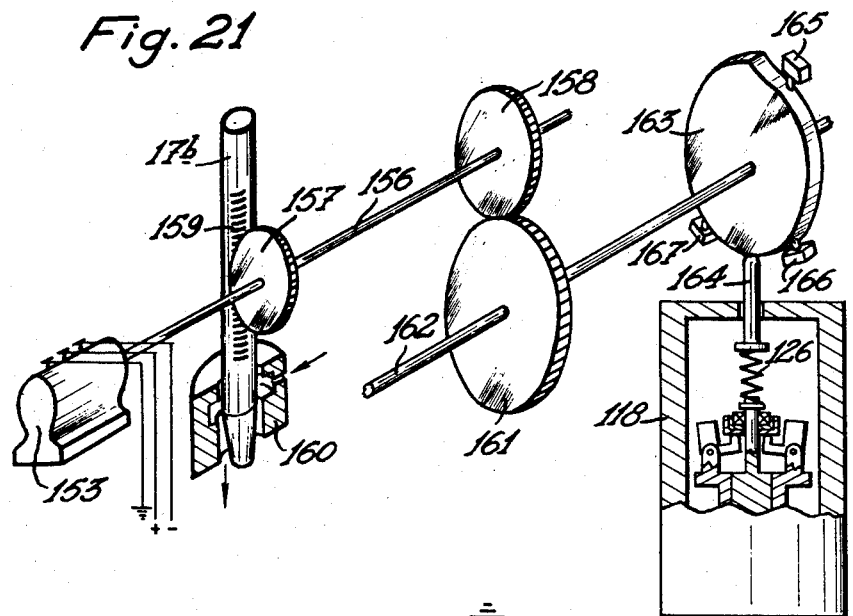
FIG. 21 is a schematic perspective view of a device for automatically bringing the turbine to its working speed, termed hereafter "automatic speeding device" and usable in any of the turbopropeller control systems illustrated in FIGS. 1, 2, 6, 7, 15 and 16.
Figure 22:
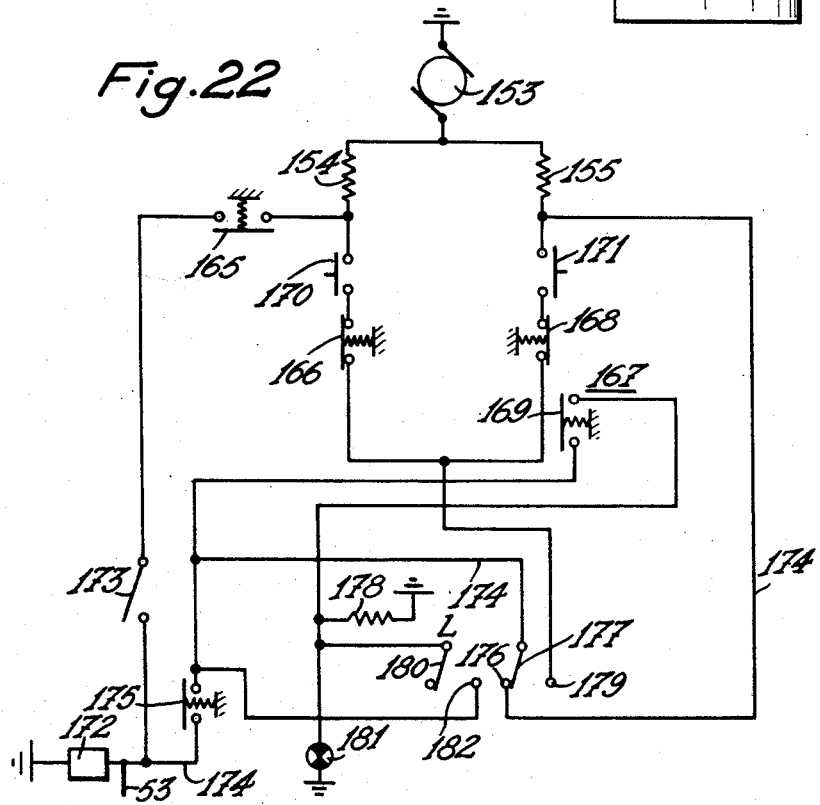
FIG. 22 is the electrical wiring diagram for the automatic speeding device illustrated in FIG. 21.

To this end, use is made of a slow-rotating, reversible electric motor 153 equipped with two field magnets 154 and 155 (FIGS. 21 and 22). On the shaft 156 of said motor are keyed two pinions 157 and 158. The pinion 157 meshes with a rack integral with the plunger 17b of the fuel delivery cock 160. The pinion 158 meshes with a further pinion 161 keyed to a shaft 162 on the end of which is also keyed a cam 163 acting upon a push-rod 164 the purpose of which is to modify as required the degree of compression of the spring 126 of the isodrome regulator 118 (FIG. 18). The cam 163 furthermore operates three microswitches 165, 166 and 167, of which microswitch 167 possesses double contacts 168 and 169.

The field magnets 154 and 155 are disposed in a bridge which comprises, in respect of field magnet 154, a speed-reduction push-button 170 and the microswitch 166 and, in respect of field magnet 155, a speed-increasing push-button 171 and the contact 168 of microswitch 167. This bridge is connected on the side of field magnet 154 to a source of current 172, through the medium of a line into which are inserted a switch 173 and the microswitch 165. Power for the field magnet 155 is provided by a line 174 into which are inserted a contact 175 actuated by a detector of turbine speed at the end of the starting phase, and the back contact 176 of the movable arm 177 of a relay L the working contact 179 of which is connected to the bridge between the microswitch 166 and contact 168 of microswitch 167. The relay L possesses a further movable arm 180 which is connected respectively to the winding 178 of this relay, to a warning lamp 181 and to one of the studs of the second contact 169 of the microswitch 167. The back contact of this arm 180 is a dead contact, whereas its working contact 182 is connected to the line 174. The second stud of contact 169 of microswitch 167 is connected to the line 174.

The system described above operates as follows:

Prior to starting, the cock 160 is closed and the contact of microswitch 165 is open so as to cut off possible energizing, from the source of current 172 and via switch 173, of the field magnet 154 which effects reduction in engine speed. Microswitch 166 is open and the double microswitch 167 has its contact 168 closed and its contact 169 open.

During the starting phase, the turbine is supplied with fuel through the idling jet 12 (FIG. 1). When it reaches the designed speed at the end of the starting phase, the speed detector, which may be constituted for instance by a pressure-contactor sensitive to compressor delivery pressure, closes the contact 175. The speed-increasing field magnet 155 is then energized via the circuit: source of current—contact 175 in closed condition—movable arm 177 on back contact 176—field magnet 155—earth. The electric motor 153 is then set rotating in the direction which causes the cock 160 to open. Microswitch 165 closes as soon as this cock opens, while microswitch 166 closes under the action of cam 163 as soon as the isodrome regulator begins to operate.

When the turbine has reached its maximum speed, then under the action of the cam 163, the double microswitch 167 opens its contact 168 and closes its contact 169. Relay 178 is then energized via the line: source of current 172—contact 175 in closed condition—contact 169 in closed condition—winding 178—earth. The relay L reverses its movable arms 177 and 180 and triggers the warning system 181, thus indicating to the pilot that the turbine is working at maximum speed. Reversal of the arm 180 provides for self-energization of the relay L, and the latter holds in. Reversal of the arm 177 cuts off automatic energizing of the field magnet 155 and put under tension the speed-reduction push-button 170 via the closed microswitch 166, and is further capable of putting under tension the speed-increasing push-button 171 after closure of contact 168 of microswitch 167.

When, in this configuration, the pilot presses push-button 170, he brings about a reduction in turbine speed down to the chosen speed, this in turn causing closure of contact 168 of microswitch 167 and opening of the contact 169 thereof. By virtue of the existence of microswitch 166, such action on the part of the pilot cannot result in engine speed descending below the lower limit of the isodrome regulator working range, since the microswitch 166 opens at that moment.

Pressure on the push-button 171 enables turbine speed to be increased at will over the full speed regulation range, contact 168 opening when maximum speed is reached.

To slow the turbine down to its idling speed and provoke closure of the cock 160, the pilot must operate the switch 173 so as to energize the field magnet 154 via the microswitch 165.

This layout, which is illustrated in FIGS. 21 and 22, replaces the throttle lever of the embodiments shown in FIGS. 1, 2, 6, 7, 15, 16 and 19a, the source of current 172 then feeding the line 53 while the remainder of the diagram in FIGS. 2, 7, 16, 19a and 19b, remains unaltered. The contacts 51 and 52 are then operated by the plunger 17b.

The layout shown in FIGS. 21 and 22 enables synchronization of the automatic speeding to be obtained in the case of a multi-engine power plant, by associating this layout to an electro-mechanical device capable of displaying synchronization differences between the gas turbines.

In the case of a two-engine installation as shown in FIG. 23, the gas turbines 183 and 184 are respectively equipped with tachometric generators 185 and 186 supplying three-phase current to electric motors 187 and 188 which respectively drive the planetary gears 189 and 190 of a differential unit 191. These planetary gears drive two spider gears 192 and 193. The spider gear 192 carries a spindle 194 equipped with a lug 195 capable of closing two normally-open contacts 196 and 197. These contacts are inserted into two lines terminating inside the bridge of an automatic speeding system J of the gas turbine 183. The device J is of the type shown in FIG. 22 and said contacts are inserted, on the one hand, between the push-button 170 and the speed-reduction field magnet 154 and, on the other hand, between the push-button 171 and the speed-increasing field magnet 155. These contacts are connected to the source 172 which also energizes the bridge, as shown in FIG. 22, and the line 53 of the diagram represented in FIGS. 2, 7, 16, 19a and 19b.

The tachometric generators 185 and 186 supply three-phase currents the frequencies of which are proportional to their rotational speeds. In consequences, the electric motors 187 and 188 rotate at equal speeds if these frequencies are equal and therefore have no effect on the differential unit 191, the spider gear 192 revolving on its spindle 194.

If, however, one of the planetary gears 189 or 190 should rotate faster than the planetary gears 190 or 189 respectively the spider gear 192 is drawn along in the direction either of the arrow b or of the arrow a and the lug 195 closes either contact 196 or contact 197, so that the control motor 153 of the gas turbine engine 183 has either its speed-reduction field magnet 154 or its speed-increasing field magnet 155 energized, as the case may be; thus the speed of turbine 183 is lowered or increased so that it becomes equal to that of turbine 184. When the speeds become equal, the system is in equilibrium once more.

Instead of acting upon only one of the automatic speeding systems, the automatic speeding system J of turbine 183 as is the case of FIG. 23, it is possible to act, through the differential, on both automatic speeding systems J for turbine 183 and K for turbine 184, by equipping the spider gear 193 with a spindle 198 having a terminal lug 199 designed to close a set of contacts 200 or 201 in the system K similar to the set of contacts 196 and 197 in the system J. It thus becomes possible to act simultaneously, so as to either increase or diminish the speed of turbine 183 while at the same time correspondingly diminishing or increasing the speed of turbine 184 until the two speeds becomes equal (FIG. 24).

In the case of a four-engine power plant comprising gas turbines 202, 203, 204 and 205 (FIG. 25), use is made of a first synchronization unit 206 to govern turbines 202 and 203, and of a further synchronization unit 207 for turbines 204 and 205, plus a further synchronization unit 208 to govern synchronization units 206 and 207, all three units 206, 207 and 208 being of the type illustrated in FIGS. 23 and 24.

The control system which is the object of the present invention offers the following advantages:

(1) There is no further need to provide mechanical stops on the pitch-control lever;

(2) The use of a temperature regulator, which has been set once for all to a maximum temperature which prevents the propeller or the rotor from assuming pitch angles which are excessive for the thermal load imposed on the gas turbine and the result of flight conditions, enables any temperature lever to be dispensed with;

(3) The design of the temperature regulator is such that it enables the turbine to be automatically set in working conditions and the propeller pitch or the rotor general-pitch to be hand-preset so long as this pitch does not entail a thermal engine loading in excess of that permitted by the temperature regulator;

(4) The pilot now only has two levers before him: a throttle lever and a pitch-control lever, plus a push-button to command automatic powering in the case of turbo-propellers;

(5) One improvement to the system, which is an object of the present invention, consists in supplementing the temperature regulator with a so-called safety box designed as a standby in the event of failure of the regulator;

(6) A further improvement allows the throttle lever also to be dispensed with, speeding of the turbine being automatically effected after its idling speed has been reached. This further improvement also allows a plurality of engines to be synchronized where multi-engine power plants are involved.

It is clearly obvious that, without departing from the scope of the invention, many modifications suggested by the state of the art or by practical applications may be made to the embodiments disclosed hereinabove. As an example, the visual indicators could be replaced by audio warning systems. Similarly, whereas the figures deal with the specific cases where the turbopropeller is equipped with an electrically or hydraulically controlled variable-pitch propeller, the variable-pitch control for the propeller could be of any other type such as mechanical or pneumatic, or any combination of said types.

What I claim is:

1. A control system for a gas turbine and a variable pitch propeller driven thereby, comprising, in combination, means for adjusting the quantity of fuel delivered to the turbine in order to maintain constant the working rotation speed thereof, means for independently controlling the blade pitch of the propeller between reverse and feathering, means for continuously comparing the actual turbine temperature with the maximum permissible temperature for said turbine, means for reducing the blade pitch as soon and as long as the actual turbine temperature tends to exceed said maximum permissible temperature, means connected to said pitch controlling means and controlled by said temperature comparing means for automatically increasing the blade pitch until maximum loading is attained for the turbine as long as the actual turbine temperature is less than said maximum permissible temperature, means interconnecting said temperature comparing means and said pitch automatically increasing means for rendering said last means ineffective as soon as the actual turbine temperature is equal to said maximum permissible temperature and for starting again said pitch automatic increasing means as soon as the actual turbine temperature decreases below said maximum permissible temperature, means for automatically rendering effective said pitch reducing means as soon as the actual turbine temperature overreaches said maximum permissible temperature, and means for rendering ineffective said last means and the pitch reducing and automatic increasing means as soon as the decreasing pitch attains a predetermined positive value.

2. A control system for a gas turbine and a variable pitch propeller driven thereby, comprising, in combination, means connected to the turbine shaft and responsive in variation to the turbine speed, means connected to said speed responsive means and adapted to vary the rate at which fuel is supplied to said turbine in reverse relation to the speed variation to maintain said speed at a constant working value after starting, means in the turbine responsive to variation in the turbine temperature, means connected to said temperature responsive means for comparing the actual turbine temperature with the maximum permissible temperature for the turbine, pitch varying means connected to the propelling device for adjusting the pitch of the blades thereof, means connected to said pitch varying means for manually controlling the blade pitch between reverse and feathering, means interconnecting said pitch varying and temperature comparing means for automatically reducing the blade pitch down to a predetermined positive value as soon and as long as the actual turbine temperature tends to exceed said maximum permissible temperature, means connected to said pitch varying means and controlled by said temperature comparing means for automatically increasing the blade pitch until maximum loading is attained for the turbine as long as the actual turbine temperature is less than said maximum permissible temperature, means interconnecting said temperature comparing means and said pitch automatically increasing means for rendering said last means ineffective as soon as the actual turbine temperature is equal to said maximum permissible temperature and for starting again said pitch automatic increasing means as soon as the actual turbine temperature decreases below said maximum permissible temperature, means for automatically rendering effective said pitch automatic reducing means as soon as the actual turbine temperature overreaches said maximum permissible temperature, means for rendering ineffective said last means and the pitch automatic reducing and automatic increasing means as soon as the decreasing pitch attains said predetermined positive value, means interconnecting the propeller and said manual pitch controlling means for indicating by the position of said last means the actual pitch attained under the action of said manual pitch controlling means and of said pitch varying, automatic reducing and automatic increasing means, and means for rendering ineffective said pitch varying means as soon as the pitch attains the reverse value under the action of said manual pitch controlling means for decreasing the pitch from said predetermined positive value.

3. A control system for a gas turbine and a variable pitch propeller driven thereby, comprising, in combination, means responsive to changes in turbine speed for varying the rate at which fuel is supplied to said turbine, motor means for varying the blade pitch of the propeller, first means normally operable for effecting movement of said motor means for decreasing said blade pitch, second means normally operable for effecting movement of said motor means for increasing said blade pitch, means responsive to the difference existing between the actual turbine temperature and the maximum permissible temperature for said turbine, means controlled by said temperature responsive means for rendering said second normally operable means ineffective and for simultaneously rendering said first normally operable means automatically effective as soon and as long as the actual turbine temperature tends to exceed said maximum permissible temperature, means connected to said second normally operable means and controlled by said temperature responsive means for rendering said second normally operable means effective as long as the actual turbine temperature is less than the maximum permissible temperature for automatically increasing the blade pitch until maximum loading is attained for the turbine, means interconnecting said temperature responsive means and said second normally operable means for rendering said last means ineffective as soon as the actual turbine temperature is equal to said maximum permissible temperature and for starting again said second normally operable means as soon as the actual turbine temperature decreases below said maximum permissible temperature, means for automatically rendering effective said first normally operable means as soon as the actual turbine temperature overreaches said maximum permissible temperature, and means for rendering ineffective said last means and the first and second normally operable means as soon as the decreasing pitch attains a predetermined positive value.

4. A control system for a gas turbine and a variable pitch propeller driven thereby, comprising, in combination, means responsive to changes in turbine speed for varying the rate at which fuel is supplied to said turbine, means responsive to the difference existing between the actual turbine temperature and the maximum permissible temperature for said turbine, blade pitch varying means controlled by said temperature responsive means for decreasing said blade pitch down to a predetermined positive value as soon and as long as the actual turbine temperature tends to exceed said maximum permissible temperature, means connected to said pitch varying means and controlled by said temperature responsive means for automatically increasing the blade pitch until maximum loading is attained for the turbine as long as the actual turbine temperature is less than said maximum permissible temperature, means interconnecting said temperature responsive means and said pitch automatically increasing means for rendering said last means ineffective as soon as the actual turbine temperature is equal to said maximum permissible temperature and for starting again said pitch automatic increasing means as soon as the actual turbine temperature decreases below said maximum permissible temperature, means for automatically rendering effective said pitch reducing means as soon as the actual turbine temperature overreaches said maximum permissible temperature, and means for rendering ineffective said last means and the pitch reducing and automatic increasing means as soon as the decreasing pitch attains said predetermined positive value.

5. A control system for a variable pitch propeller provided with a hydraulically-controlled feathering device and drivably connected to a gas turbine the fuel feed line of which comprises hand-operated flameout cocks and a master cut-off valve, comprising, in combination, means connected to the turbine shaft and responsive in variation to the turbine speed, means connected to said speed responsive means and inserted in the fuel feed line of the turbine for varying the rate at which fuel is supplied to said turbine in reverse relation to the speed variation to maintain said speed at a constant working value after starting, a line interconnecting the hydraulically-controlled feathering device of the variable pitch propeller and the means for varying the rate of fuel supply to the turbine, an auxiliary cock inserted in said line, means controlled by the pilot for closing the flameout cocks and the master cut-off valve and for simultaneously opening said auxiliary cock, whereby the feathering of the propeller is obtained before the turbine is stopped.

6. A control system for an aerodynamic propelling device having variable-pitch blades and drivably connected to a gas turbine the fuel feed line of which comprises hand-operated flameout cocks and a master cut-off valve, comprising, in combination, means connected to the turbine shaft and responsive in variation to the turbine speed, means connected to said speed responsive means and inserted in the fuel feed line of the turbine for varying the rate at which fuel is supplied to said turbine in reverse relation to the speed variation to maintain said speed at a constant working value after starting, a hydraulic-power bleed inserted in said means for varying the rate of fuel supply to the turbine, an auxiliary cock inserted in said bleed, means controlled by the pilot for closing the flameout cocks and the master cut-off valve and for simultaneouly opening said auxiliary cock, whereby said bleed may be used for operating any hydraulic auxiliary system before the turbine is stopped.

7. A control system for a variable pitch propeller drivably connected to a gas turbine provided with starting circuits and the fuel feed line of which comprises a master cut-off valve, hand-operated flameout cocks, a hand-operated fuel-feed adjustment cock and an idling-speed jet, comprising, in combination, means controlled by the pilot for successively opening the flameout cocks and the master cut-off valve, means controlled by the pilot for successively rendering the starting circuits effective, opening the fuel-feed adjustment cock as soon as the idling speed has been stabilized and rendering said starting circuits ineffective as soon as said fuel-feed adjustment cock is fully opened, and means for rendering said two means effective only for a pitch equal to the zero-thrust pitch of the propeller.

8. A control system for a helicopter rotor drivably connected to a gas turbine provided with starting circuits and the fuel feed line of which comprises a master cut-off valve, hand-operated flameout cocks, a hand-operated fuel-feed adjustment cock and an idling-speed jet, comprising, in combination, means controlled by the pilot for successively opening the flameout cocks and the master cut-off valve, means controlled by the pilot for successively rendering the starting circuits effective, opening the fuel-feed adjustment cock as soon as the idling speed has been stabilized and rendering said starting circuits ineffective as soon as said fuel-feed adjustment cock is fully opened, and means for rendering said two means effective only for a general pitch for the rotor equal to zero.

9. A control system for a gas turbine provided with conventional starting circuits and a hydraulically-controlled variable pitch propeller driven thereby and fed with operative oil by means of an independent auxiliary starting oil pump and a main oil pump driven by the turbine and inserted in the propeller hydraulic circuit, comprising, in combination, means for independently controlling the blade pitch for the propeller between reverse and feathering, means for continuously comparing the actual turbine temperature with the maximum permissible temperature for said turbine, means for reducing the blade pitch as soon and as long as the actual turbine temperature tends to exceed said maximum permissible temperature, means inserted in the propeller hydraulic circuit and connected to said blade pitch controlling means for transmitting to the propeller a pitch variation order, means connected to said propeller hydraulic circuit and to the turbine starting circuits and responsive to the oil pressure in said hydraulic circuit for rendering effective said starting circuits, means inserted between the propeller hydraulic circuit and the auxiliary oil pump and responsive to the differential hydraulic pressure between said hydraulic circuit and the output of said auxiliary oil pump for starting said auxiliary pump before the turbine is started and stopping said auxiliary pump as soon as the main pump is started, means connected to the propeller hydraulic circuit for instantaneously zeroizing the oil pressure in said propeller hydraulic circuit with a view to increase the blade pitch up to feathering, and means inserted in the fuel feeding line of the turbine and connected to said propeller hydraulic circuit for cutting off the fuel feeding of said turbine as soon as said pressure zeroizing means is effective.

10. A control system for a gas turbine provided with conventional starting circuits and a hydraulically controlled variable pitch propeller driven thereby and fed with operative oil by means of an independent auxiliary starting oil pump and a main oil pump driven by the turbine and inserted in the propeller hydraulic circuit, comprising, in combination, means connected to the turbine shaft and responsive in variation to the turbine speed, means connected to said speed responsive means and adapted to vary the rate at which fuel is supplied to said turbine in reverse relation to the speed variation to maintain said speed at a constant working value after starting, means in the turbine responsive to variation in the turbine temperature, means connected to said temperature responsive means for comparing the actual turbine temperature with the maximum permissible temperature for the turbine, pitch varying means connected to the propelling device for adjusting the pitch of the blades thereof, means connected to said pitch varying means for manually controlling the blade pitch between reverse and feathering, means interconnecting said pitch varying and temperature comparing means for automatically reducing the blade pitch down to a predetermined positive value as soon and as long as the actual turbine temperature tends to exceed said maximum permissible temperature, means inserted in the propeller hydraulic circuit and connected to said blade pitch varying means for transmitting to the propeller a pitch variation order, means connected to said propeller hydraulic circuit and to the turbine starting circuits and responsive to the oil pressure in said hydraulic circuit for rendering effective said starting circuits, means inserted between the propeller hydraulic circuit and the auxiliary oil pump and responsive to the differential hydraulic pressure between said hydraulic circuit and the output of said auxiliary oil pump for starting said auxiliary pump before the turbine is started and stopping said auxiliary pump as soon as the main pump is started, means connected to the propeller hydraulic circuit for instantaneously zeroizing the oil pressure in said propeller hydraulic circuit with a view to increase the blade pitch up to feathering, means inserted in the fuel feeding line of the turbine and connected to said propeller hydraulic circuit for cutting off the fuel feeding of said turbine as soon as said pressure zeroizing means is effective, means interconnecting the pitch order transmitting means and said manual pitch controlling means for indicating by the position of said last means the actual pitch of the propeller, and means for rendering ineffective said pitch varying means as soon as reverse and feathering are attained.

11. A control system for a gas turbine provided with conventional starting circuits and a hydraulically-controlled variable pitch propeller driven thereby and fed with operative oil by means of an independent auxiliary starting oil pump and a main oil pump driven by the turbine and inserted in the propeller hydraulic circuit, comprising, in combination, means responsive to changes in turbine speed for varying the rate at which fuel is supplied to said turbine, motor means for varying the blade pitch of the propeller, first means normally operable for effecting movement of said motor means for decreasing said blade pitch, second means normally operable for effecting movement of said motor means for increasing said blade pitch, means responsive to the difference existing between the actual turbine temperature and the maximum permissible temperature for said turbine, means inserted in the propeller hydraulic circuit and connected to said motor means for transmitting to the propeller a pitch variation order, means connected to said propeller hydraulic circuit and to the turbine starting circuits and responsive to the oil pressure in said hydraulic circuit for rendering effective said starting circuits, means inserted between the propeller hydraulic circuit and the auxiliary oil pump and responsive to the differential hydraulic pressure between said hydraulic circuit and the output of said auxiliary oil pump for starting said auxiliary pump before the turbine is started and stopping said auxiliary pump as soon as the main pump is started, means connected to the propeller hydraulic circuit for instantaneously zeroizing the oil pressure in said propeller hydraulic circuit with a view to increase the blade pitch up to feathering, means inserted in the fuel feeding line of the turbine and connected to said propeller hydraulic circuit for cutting off the fuel feeding of said turbine as soon as said pressure zeroizing means is effective, means controlled by said temperature responsive means for rendering said first and second normally operable means ineffective as soon and as long as the actual turbine temperature is equal to said maximum permissible temperature, and means controlled by said temperature responsive means for rendering said first normally operable means effective as soon and as long as the actual turbine temperature exceeds said maximum permissible temperature.

12. A control system according to claim 10, further comprising means connected to the pitch order transmitting means and responsive to a jamming in said pitch order transmitting means and to an oil leak in the propeller hydraulic circuit, means connected to the blade pitch controlling means and responsive to a jamming in said blade pitch controlling means, and electrical warning circuits connected to said jamming responsive means.

13. A control system for a gas turbine and an aerodynamic propelling device driven thereby and having variable-pitch blades, comprising, in combination, means for independently controlling the blade pitch of the propelling device between the maximum and minimum permissible pitches, means for continuously comparing the actual turbine temperature with the maximum permissible temperature for said turbine, means for reducing the blade pitch as soon and as long as the actual turbine temperature tends to exceed said maximum permissible temperature, safety means for continuously comparing the actual turbine temperature with a predetermined overheat temperature greater than said maximum permissible temperature, safety means interconnecting said temperature comparing safety means and said pitch reducing means for rendering said last means effective in case of failure in the temperature comparing means as soon and as long as the actual turbine temperature tends to exceed said overheat temperature, and means for indicating the actual pitch attained under the action of said pitch controlling and reducing means.

14. A control system for a gas turbine and an aerodynamic propelling device driven thereby and having variable-pitch blades, comprising, in combination, means connected to the turbine shaft and responsive in variation to the turbine speed, means connected to said speed responsive means and adapted to vary the rate at which fuel is supplied to said turbine in reverse relation to the speed variation to maintain said speed at a constant working value after starting, means in the turbine responsive to variation in the turbine temperature, means connected to said temperature responsive means for comparing the actual turbine temperature with the maximum permissible temperature for the turbine, pitch varying means connected to the propelling device for adjusting the pitch of the blades thereof, means connected to said pitch varying means for manually controlling the blade pitch between its minimum and maximum permissible values, means interconnecting said pitch varying and temperature comparing means for automatically reducing the blade pitch down to a predetermined positive value as soon and as long as said actual turbine temperature tends to exceed said maximum permissible temperature, safety means for continuously comparing the actual turbine temperature with a predetermined overheat temperature greater than said maximum permissible temperature, safety means interconnecting said temperature comparing safety means and said pitch reducing means for rendering said last means effective in case of failure in the temperature comparing means as soon and as long as the actual turbine temperature tends to exceed said overheat temperature, means interconnecting the propelling device and said manual pitch controlling means for indicating by the position of said last means the actual pitch attained under the action of said manual pitch controlling means and of said automatic pitch reducing means, and means for rendering ineffective said pitch varying means as soon as the minimum and maximum pitches are attained.

15. A control system for a gas turbine and an aerodynamic propelling device driven thereby and having variable-pitch blades, comprising, in combination, means responsive to changes in turbine speed for varying the rate at which fuel is supplied to said turbine, motor means for varying the blade pitch of the propelling device, first means normally operable for effecting movement of said motor means for decreasing said blade pitch, second means normally operable for effecting movement of said motor means for increasing said blade pitch, means responsive to the difference existing between the actual turbine temperature and the maximum permissible temperature for said turbine, means controlled by said temperature responsive means for rendering said second normally operable means ineffective and for simultaneously rendering said first normally operable means automatically effective as soon and as long as the actual turbine temperature tends to exceed said maximum permissible temperature, safety means for continuously comparing the actual turbine temperature with a predetermined overheat temperature greater than said maximum permissible temperature, safety means interconnecting said temperature comparing safety means and said first normally operable means for rendering said last means effective in case of failure in the temperature comparing means as soon and as long as the actual turbine temperature tends to exceed said overheat temperature, and means for indicating the actual pitch attained under the action of said pitch controlling and reducing means.

16. A control system for a gas turbine and a variable pitch propeller driven thereby, comprising, in combination, means responsive to the difference existing between the actual turbine temperature and the maximum permissible temperature for said turbine, blade pitch varying means controlled by said temperature responsive means for decreasing said blade pitch down to a predetermined positive value as soon and as long as the actual turbine temperature tends to exceed said maximum permissible temperature, safety means for continuously comparing the actual turbine temperature with a predetermined overheat temperature greater than said maximum permissible temperature, safety means interconnecting said temperature comparing safety means and said pitch varying means for decreasing said blade pitch down to said predetermined positive value in case of failure in the temperature comparing means as soon and as long as the actual turbine temperature tends to exceed said overheat temperature, safety means interconnecting said temperature comparing safety means and said pitch controlling means for automatically increasing the pitch up to feathering when during the decreasing of the pitch the actual turbine temperature remains greater than said overheat temperature and means for relighting the turbine although the actual turbine temperature remains greater than said overheat temperature.

17. A control system for a gas turbine and a variable pitch propeller driven thereby, comprising, in combination, means for adjusting the quantity of fuel delivered to the turbine in order to maintain constant the working rotation speed thereof, means for independently controlling the blade pitch of the propeller between reverse and feathering, means for continuously comparing the actual turbine temperature with the maximum permissible temperature for said turbine, means for reducing the blade pitch as soon and as long as the actual turbine temperature tends to exceed said maximum permissible temperature, means connected to said pitch controlling means and controlled by said temperature comparing means for automatically increasing the blade pitch until maximum loading is attained for the turbine as long as the actual turbine temperature is less than said maximum permissible temperature, safety means for continuously comparing the actual turbine temperature with a predetermined overheat temperature greater than said maximum permissible temperature, safety means interconnecting said temperature comparing safety means and said pitch reducing means for rendering said last means effective in case of failure in the temperature comparing means as soon and as long as the actual turbine temperature tends to exceed said overheat temperature, means for indicating the actual pitch attained under the action of said pitch controlling and reducing means, safety means interconnecting said temperature comparing safety means and said pitch controlling means for automatically increasing the pitch up to feathering when during the decreasing of the pitch the actual turbine temperature remains greater than said overheat temperature, and means for relighting the turbine although the actual turbine temperature remains greater than said overheat temperature.

18. A control system for a gas turbine and a variable pitch propeller driven thereby, comprising, in combination, means for adjusting the quantity of fuel delivered to the turbine in order to maintain constant the working rotation speed thereof, means for independently controlling the blade pitch of the propeller between reverse and feathering, means for continuously comparing the actual turbine temperature with the maximum permissible temperature for said turbine, means for reducing the blade pitch as soon and as long as the actual turbine temperature tends to exceed said maximum permissible temperature, means connected to said pitch controlling means and controlled by said temperature comparing means for automatically increasing the blade pitch until maximum loading is attained for the turbine as long as the actual turbine temperature is less than said maximum permissible temperature, means interconnecting said temperature comparing means and said pitch automatic increasing means for rendering said last means ineffective as soon as the actual turbine temperature is equal to said maximum permissible temperature and for starting again said pitch automatic increasing means as soon as the actual turbine temperature decreases below said maximum permissible temperature, means for automatically rendering effective said pitch reducing means as soon as the actual turbine temperature overreaches said maximum permissible temperature, means for rendering ineffective said last means and the pitch reducing and automatic increasing means as soon as the decreasing pitch attains a predetermined positive value, safety means for continuously comparing the actual turbine temperature with a predetermined overheat temperature greater than said maximum permissible temperature, safety means interconnecting said temperature comparing safety means and said pitch reducing means for rendering said last means effective in case of failure in the temperature comparing means as soon and as long as the actual turbine temperature tends to exceed said overheat temperature, safety means interconnecting said temperature comparing safety means and said pitch controlling means for automatically increasing the pitch up to feathering when during the decreasing of the pitch the actual turbine temperature remains greater than said overheat temperature, and means for relighting the turbine although the actual turbine temperature remains greater than said overheat temperature.

19. A control system for a gas turbine and a variable pitch propeller driven thereby, comprising, in combination, means for adjusting the quantity of fuel delivered to the turbine in order to maintain constant the working rotation speed thereof, means independently controlling the blade pitch of the propeller between reverse and feathering, means for continuously comparing the actual turbine temperature with the maximum permissible temperature for said turbine, means for reducing the blade pitch as soon and as long as the actual turbine temperature tends to exceed said maximum permissible temperature, means connected to said pitch controlling means and controlled by said temperature comparing means for automatically increasing the blade pitch until maximum loading is attained for the turbine as long as the actual turbine temperature is less than said maximum permissible temperature, safety means for continuously comparing the actual turbine temperature with a predetermined overheat temperature greater than said maximum permissible temperature, safety means interconnecting said temperature comparing safety means and said pitch reducing means for rendering said last means effective in case of failure in the temperature comparing means as soon and as long as the actual turbine temperature tends to exceed said overheat temperature, means for indicating the actual pitch attained under the action of said pitch controlling and reducing means, and safety means controlled by said temperature comparing safety means for indicating to the pilot a call for feathering when during the decreasing of the pitch the actual turbine temperature remains greater than said overheat temperature.

20. A control system for a gas turbine and an aerodynamic propelling device driven thereby and having variable-pitch blades, comprising, in combination, means for adjusting the quantity of fuel delivered to the turbine in order to maintain constant the working rotation speed thereof, means for independently controlling the blade pitch of the propelling device between the maximum and minimum permissible pitches, means continuously comparing the actual turbine temperature with the maximum permissible temperature for said turbine, means for reducing the blade pitch as soon and as long as said actual turbine temperature tends to exceed said maximum permissible temperature, and means for permitting automatic setting-in-working-speed of the turbine as well as fine adjustment of said working speed.

21. A control system for a gas turbine and an aerodynamic propelling device driven thereby and having variable-pitch blades, comprising, in combination, means responsive to changes in turbine speed for varying the rate at which fuel is supplied to said turbine in order to maintain constant the working speed thereof, motor means for varying the blade pitch of the propeller, first means normally operable for effecting movement of said motor means for decreasing said blade pitch, second means normally operable for effecting movement of said motor means for increasing said blade pitch, means responsive to the difference existing between the actual turbine temperature and the maximum permissible temperature for said turbine, means controlled by said temperature responsive means for rendering said second normally operable means ineffective and for simultaneously rendering said first normally operable means automatically effective as soon and as long as the actual turbine temperature tends to exceed said maximum permissible temperature, and means for permitting automatic setting-in-working-speed of the turbine as well as fine adjustment of said working speed.

22. A control system for a gas turbine and an aerodynamic propelling device driven thereby and having variable-pitch blades, comprising, in combination, means connected to the turbine shaft and responsive in variation to the turbine speed, means connected to said speed responsive means and adapted to vary the rate at which fuel is supplied to said turbine in reverse relation to the speed variation to maintain said speed at a constant working value after starting, means in the turbine responsive to variation in the turbine temperature, means connected to said temperature responsive means for comparing the actual turbine temperature with the maximum permissible temperature for the turbine, pitch varying means connected to the propelling device for adjusting the pitch of the blades thereof, means connected to said pitch varying means for manually controlling the blade pitch between its minimum and maximum permissible values, means interconnecting said pitch varying and temperature comparing means for automatically reducing the blade pitch down to a predetermined positive value as soon and as long as said actual turbine temperature tends to exceed said maximum permissible temperature, means interconnecting the propelling device and said manual pitch controlling means for indicating by the position of said last means the actual pitch attained under the action of said manual pitch controlling means and of said automatic pitch reducing means, means for rendering ineffective said pitch varying means as soon as the minimum and maximum pitches are attained, and means for permitting automatic setting-in-working-speed of the turbine as well as fine adjustment of said working speed.

23. A control system for a gas turbine and an aerodynamic propelling device driven thereby and having variable-pitch blades, comprising, in combination, means for adjusting the quantity of fuel delivered to the turbine in order to maintain constant the working rotation speed thereof, means for independently controlling the blade pitch of the propelling device between the maximum and minimum permissible pitches, means for continuously comparing the actual turbine temperature with the maximum permissible temperature for said turbine, means for reducing the blade pitch as soon and as long as said actual turbine temperature tends to exceed said maximum permissible temperature, means for detecting the final starting speed of the turbine, means for automatically increasing the rotational turbine speed up to the working speed as soon as the final starting speed is obtained, means for indicating the obtainment of the maximum working speed, means for adjusting the working speed in the speed range extending from the speed corresponding to the lower operative limit of the quantity of fuel adjusting means and said maximum working speed, and means for zeroizing the action of said rotational speed automatic increasing and working speed adjusting means in order to bring back the turbine at its idle speed.

24. A control system for a gas turbine comprising, in combination, means responsive to changes in turbine speed for varying the rate at which fuel is supplied to said turbine in order to maintain constant the working speed thereof, means for detecting the final starting speed of the turbine, means for automatically increasing the rotational turbine speed up to the working speed as soon as the final starting speed is obtained, means for indicating the obtainment of the maximum working speed, means for adjusting the working speed in the speed range extending from the speed corresponding to the lower operative limit of the rate of fuel varying means and said maximum working speed, and means for zeroizing the action of said rotational speed automatic increasing and working speed adjusting means in order to bring back the turbine at its idle speed.

25. A control system for a gas turbine and an aerodynamic propelling device driven thereby and having variable-pitch blades, comprising, in combination, means for adjusting the quantity of fuel delivered to the turbine in order to maintain constant the working rotation speed thereof, means for independently controlling the blade pitch of the propelling device between the maximum and minimum permissible pitches, means for continuously comparing the actual turbine temperature with the maximum permissible temperature of said turbine, means for reducing the blade pitch as soon and as long as the actual turbine temperature tends to exceed said maximum permissible temperature, motor means for varying the turbine rotational speed, first means normally operable for effecting movement of said motor means for decreasing said rotational speed, second means normally operable for effecting movement of said motor means for increasing said rotational speed, means for detecting the final starting speed of the turbine, means controlled by said detecting means for rendering said first normally operable means ineffective and for simultaneously rendering said second normally operable means effective as soon as the final starting speed is obtained, means controlled by said motor means for rendering said first and second normally operable means ineffective as soon as the maximum working speed of the turbine has been attained, means operable by the pilot for rendering said first and second normally operable means effective in order to adjust the working speed in the speed range extending from the speed corresponding to the lower operative limit of said quantity of fuel adjusting means to said maximum working speed, and means controlled by the pilot for rendering said second normally operable means ineffective and for simultaneously rendering said first normally operable means effective in order to bring back the turbine at its idle speed.

26. A control system for a gas turbine and an aerodynamic propelling device driven thereby and having variable-pitch blades, comprising, in combination, means responsive to changes in turbine speed for varying the rate at which fuel is supplied to said turbine in order to maintain constant the working speed thereof, motor means for varying the blade pitch of the propeller, first means normally operable for effecting movement of said motor means for decreasing said blade pitch, second means normally operable for effecting movement of said motor means for increasing said blade pitch, means responsive to the difference existing between the actual turbine temperature and the maximum permissible temperature for said turbine, means controlled by said temperature responsive means for rendering said second normally operable means ineffective and for simultaneously rendering said first normally operable means automatically effective as soon and as long as the actual turbine temperature tends to exceed said maximum permissible temperature, second motor means for varying the turbine rotational speed, third means normally operable for effecting movement of said second motor means for decreasing said rotational speed, fourth means normally operable for effecting movement of said second motor means for increasing said rotational speed, means for detecting the final starting speed of the turbine, means controlled by said detecting means for rendering said third normally operable means ineffective and for simultaneously rendering said fourth normally operable means effective as soon as the final starting speed is obtained, means controlled by said second motor means for rendering said third and fourth normally operable means ineffective as soon as the maximum working speed of the turbine has been attained, means operable by the pilot for rendering said third and fourth normally operable means effective in order to adjust the working speed in the speed range extending from the speed corresponding to the lower operative limit of said rate of fuel varying means to said maximum working speed, and means controlled by the pilot for rendering said fourth normally operable means ineffective and for simultaneously rendering said third normally operable means effective in order to bring back the turbine at its idle speed.

27. A control system for a gas turbine driving an aerodynamic propelling device comprising, in combination, means responsive to changes in turbine speed for varying the rate at which fuel is supplied to said turbine in order to maintain constant the working speed thereof, motor means for varying the turbine rotational speed, first means normally operable for effecting movement of said motor means for decreasing said rotational speed, second means normally operable for effecting movement of said motor means for increasing said rotational speed, means for detecting the final starting speed of the turbine, means controlled by said detecting means for rendering said first normally operable means ineffective and for simultaneously rendering said second normally operable means effective as soon as the final starting speed is obtained, means controlled by said motor means for rendering said first and second normally operable means ineffective as soon as the maximum working speed of the turbine has been attained, means operable by the pilot for rendering said first and second normally operable means effective in order to adjust the working speed in the speed range extending from the speed corresponding to the lower operative limit of said rate of fuel varying means to said maximum working speed, and means controlled by the pilot for rendering said second normally operable means ineffective and for simultaneously rendering said first normally operable means effective in order to bring back the turbine at its idle speed.

28. A control system for a gas turbine and an aerodynamic propelling device driven thereby and having variable-pitch blades, comprising, in combination, means for adjusting the quantity of fuel delivered to the turbine in order to maintain constant the working rotation speed thereof, temperature responsive means in said turbine, means connected to said temperature responsive means for comparing the actual turbine temperature with the maximum permissible temperature for said turbine, pitch varying means connected to the propelling device, means interconnecting said pitch varying and temperature comparing means for, firstly, automatically increasing the blade pitch until maximum loading is attained for the turbine as long as the actual turbine temperature is less than said maximum permissible temperature, secondly, automatically reducing the blade pitch as soon and as long as the actual turbine temperature tends to exceed said maximum permissible temperature and, thirdly, automatically increasing again the blade pitch as soon as the actual turbine temperature decreases below said maximum permissible temperature, means for rendering ineffective said interconnecting means as soon as the decreasing pitch attains a predetermined positive value, a manually operable lever connected to said pitch varying means for manually controlling the blade pitch between its minimum and maximum permissible values, means for rendering ineffective said pitch varying means as soon as the blade pitch attains said minimum and maximum permissible values, and means connecting said lever with the propelling device for automatically displacing said lever under the action exerted by said interconnecting means on said pitch varying means connected to said propelling device so that the position of said lever indicates the actual blade pitch attained under said action while any manual action exerted on said lever and attempting to oppose its automatic displacement remains ineffective.

(References on following page)

References Cited in the file of this patent

UNITED STATES PATENTS

| | | |
|---|---|---|
| 1,893,861 | Havill | Jan. 10, 1933 |
| 2,392,556 | Seppeler | Jan. 8, 1946 |
| 2,575,229 | Moore | Nov. 13, 1951 |
| 2,632,996 | Rood | Mar. 31, 1953 |
| 2,640,550 | Knapp et al. | June 2, 1953 |
| 2,667,228 | Wood et al. | Jan. 26, 1954 |
| 2,694,900 | Brandau | Nov. 23, 1954 |
| 2,696,269 | Chilman | Dec. 7, 1954 |
| 2,737,252 | Knapp et al. | Mar. 6, 1956 |
| 2,763,328 | Sullivan et al. | Sept. 18, 1956 |
| 2,794,507 | Banning | June 4, 1957 |
| 2,901,885 | Reggio | Sept. 1, 1959 |